(12) United States Patent
Parikh et al.

(10) Patent No.: US 8,805,714 B2
(45) Date of Patent: Aug. 12, 2014

(54) USER INTERFACE DISPLAYING COMMUNICATION INFORMATION

(75) Inventors: Mihir Parikh, Secaucus, NJ (US);
Robert M. Fabricant, Brooklyn, NY (US); Ed Hicks, Brooklyn, NY (US)

(73) Assignee: IPC Systems, Inc., Jersey City, NJ (US)

( * ) Notice: Subject to any disclaimer, the term of this patent is extended or adjusted under 35 U.S.C. 154(b) by 7 days.

(21) Appl. No.: 13/353,932

(22) Filed: Jan. 19, 2012

(65) Prior Publication Data

US 2012/0191504 A1    Jul. 26, 2012

Related U.S. Application Data

(60) Provisional application No. 61/434,708, filed on Jan. 20, 2011.

(51) Int. Cl.
*G06Q 10/00* (2012.01)

(52) U.S. Cl.
USPC ......................... 705/7.29; 705/7.37

(58) Field of Classification Search
USPC ................................. 705/7.29, 7.37
See application file for complete search history.

(56) References Cited

U.S. PATENT DOCUMENTS

| | | | |
|---|---|---|---|
| 5,778,357 A * | 7/1998 | Kolton et al. | 707/603 |
| 5,848,396 A | 12/1998 | Gerace | 705/10 |
| 6,513,019 B2 * | 1/2003 | Lewis | 705/35 |
| 7,096,223 B2 | 8/2006 | Cope | 707/100 |
| 7,222,096 B2 | 5/2007 | Anaya et al. | 705/37 |
| 7,702,563 B2 * | 4/2010 | Balson et al. | 705/37 |
| 2002/0120555 A1 * | 8/2002 | Lerner | 705/37 |
| 2003/0009411 A1 | 1/2003 | Ram et al. | 705/37 |
| 2008/0046471 A1 | 2/2008 | Moore et al. | 707/104.1 |
| 2008/0313098 A1 * | 12/2008 | Janowski et al. | 705/36 R |
| 2010/0262901 A1 * | 10/2010 | DiSalvo | 715/227 |

OTHER PUBLICATIONS

Cheng, H. et al., "An ontology-based business intelligence application in a financial knowledge management system", Expert Systems with Applications, vol. 36, issue 2, part 2, Mar. 2009, pp. 3614-3622.
International Search Report and Written Opinion for International Application No. PCT/US2012/021866, dated Aug. 3, 2012 (7 pages).

* cited by examiner

*Primary Examiner* — Mark A Fleischer

(74) *Attorney, Agent, or Firm* — Fitzpatrick, Cella, Harper & Scinto

(57) ABSTRACT

A processor aggregates communications data received from one or more data sources via a communications network. The processor associates the aggregated communications data with supplemental data. The associated communications data is correlated based on temporal data, a tag, a query, and/or a command. A graphical user interface (GUI) is formatted based on the correlated communications data. The formatted GUI is provided to a display device.

30 Claims, 16 Drawing Sheets

USER INTERFACE DISPLAYING COMMUNICATION INFORMATION

CROSS-REFERENCE TO RELATED APPLICATION

This application claims priority to U.S. Provisional Application No. 61/434,708, filed Jan. 20, 2011, the contents of which are incorporated herein by reference.

BACKGROUND OF THE INVENTION

1. Field of the Invention

Example aspects of the present invention generally relate to a user interface, and more particularly to systems, methods, and computer program products for providing a user interface displaying communication information that is of relevance to an end user, such as a financial trader.

2. Related Art

In the financial industry, it is common for a group of financial traders to be members of a trading desk that is managed by a head financial trader. As part of their duties, each of the traders often communicates with various parties (e.g., buyers and sellers of financial instruments) by using various means (e.g., voice calls, instant messages, e-mails). In some cases, the traders communicate with multiple parties at a time, discussing trades, market information, and/or other relevant information. For the head trader to effectively manage the trading desk, the head trader is required to quickly analyze various types of information, such as trader communications, market information, and other relevant information, as well as the relationships between these types of information.

However, with the vast volume of trades taking place in today's financial markets, and the limitless trader communications, market information, and other relevant information, such rapid analysis of relevant information may require significant time and effort, and in some cases, may even be impractical.

BRIEF DESCRIPTION

The example embodiments described herein meet the above-identified needs by providing systems, methods, and computer program products for providing a user interface.

In one example embodiment, a processor aggregates communications data received from one or more data sources via a communications network. The processor associates the aggregated communications data with supplemental data. The associated communications data is correlated based on temporal data, a tag, a query, and/or a command. A graphical user interface (GUI) is formatted based on the correlated data. The formatted GUI is provided to a display device.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings.

DETAILED DESCRIPTION

I. Overview

Figure 1:
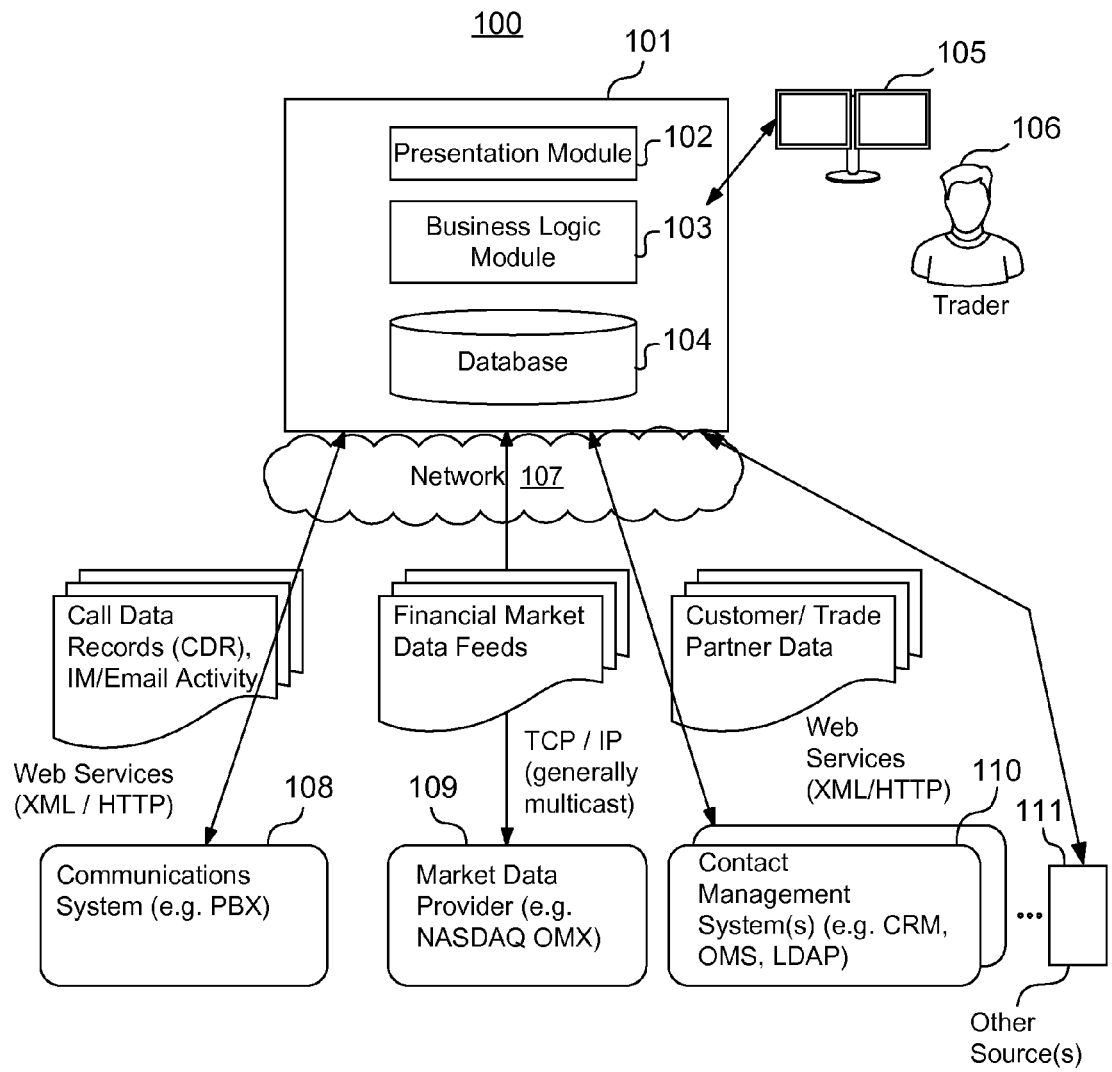
FIG. 1 is a representative view of a system in which some embodiments of the invention may be implemented.

The example embodiments of the invention presented herein are directed to systems, methods, and computer program products for providing a user interface displaying communications data, which are now described herein in terms of an example trading environment. This description is not intended to limit the application of the example embodiments presented herein. In fact, after reading the following description, it will be apparent to one skilled in the relevant art(s) how to implement the following invention in alternative environments, such as a services-based environment, a web services-based environment, and/or the like.

II. Definitions

Some terms are defined below for easy reference. However, it should be understood that the defined terms are not rigidly restricted to their definitions. A term may be further defined by its use in other sections of this description.

"Device" means software, hardware or a combination thereof. A device may sometimes be referred to as an apparatus. Examples of a device include without limitation a laptop computer, a database, a server, a display, a computer mouse, and a hard disk.

"Graphical user interface (GUI) element" means any element of a GUI, such as, for example, a window, a menu, an icon, a control, a widget, an adjustment handle, a tab, a text box, a button (i.e., a soft button), a hyperlink, a drop-down list, a list box, a check box, a radio button, a cycle button, a datagrid, and/or the like.

"Network" means a connection between any two or more computers, which permits the transmission of data. A network may be any combination of networks, including without limitation the Internet, a network of networks, a local area network (e.g., home network, intranet), a wide area network, a wireless network and a cellular network.

"Server" means a software application that provides services to other computer programs (and their users), in the same or another computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" and "application" mean a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++, and Java. Further, the functions of some embodiments, when described as a series of steps for a method, could be implemented as a series of software instructions for being operated by a processor, such that the embodiments could be implemented as software, hardware, or a combination thereof. Non-transitory computer-readable media are discussed in more detail in a separate section below.

"System" means a device or multiple coupled devices. A device is defined above.

"Tag" means a type of metadata (e.g., a keyword or a term) assigned to an item of information. In general, a tag helps describe the item to which it is assigned and allows the item to be found again via browsing, searching, entering a command, entering a query, and/or the like. As described in further detail below, example tags include a particular filter option, a particular connections option, a particular group by option, a name of a party or trader, a name of a party to a communication, a ticker symbol of a particular stock, and/or the like. However, these example tags should not be construed as limiting.

"Temporal data" generally means any data relating to time, such as a particular time, or a sequence of time.

III. System

FIG. 1 is a representative view of a system 100 in which some embodiments of the invention may be implemented. As shown in FIG. 1, system 100 includes a server 101, a network 107, a communications system 108, a market data provider 109, a contact management system 110, other data source(s) 111, and a computer 105.

The server 101 is communicatively coupled via communications network 107 to one or more data sources, including the communications system 108, the market data provider 109, the contact management system 110, and/or other data source(s) 111. In general, the server 101 utilizes data received from each of the one or more data sources 108-111 to generate and present to a user 106 (e.g., a head financial trader) a GUI displaying communications information and/or other relevant information.

The server 101 receives communications data from the communications system 108 via the communication network 107. Communications data, in this context, generally refers to any type of data associated with a communication between two or more parties. Example types of communications data include call data records (CDR), instant message (IM) activity, e-mail activity, an originating telephone number, a destination telephone number, and/or the like. Communications data may also include temporal data associated with a communication, such as a time duration of a communication, a start time of a communication, an end time of a communication, etc. In one example embodiment, the communications system 108 communicates by using web services, such as (extensible markup language) XML and/or (hypertext transfer protocol) HTTP. According to another example embodiment, the server 101 utilizes a publicly available application programming interface (API) to retrieve communications data from the communication system 108 via standard Internet Protocol (IP) communication protocols. One example of communication system 108 includes a private branch exchange (PBX).

In one example embodiment, the server 101 also receives market data from the market data provider 109 via the communication network 107. Market data, in this context, generally refers to any type of data associated with any type of market, such as a financial market. Example types of market data include financial index data (e.g., from the S&P 500™, NASDAQ OMX™, etc.), individual stock performance over time, etc. Another example type of market data is temporal market data, such as a time associated with a particular stock price, financial index value, and/or the like. The market data provider 109 communicates market data in the form of one or more financial market data feeds multicasting communications using Transfer Control Protocol/Internet Protocol (TCP/IP), according to one example.

The server 101 receives contact data from the contact management system 110 via the communication network 107. Contact data, in this context, generally refers to any type of data associated with contacts (e.g., customers, business entities, other traders, employees within a business, etc.). An example type of contact data is information from customers and/or trading partners, such as, for example, a name of a trader, a company, and/or an asset class associated with a particular phone number. In one example embodiment, the server 101 associates contact data with communications data by utilizing a predetermined mapping of particular phone numbers to particular contacts.

Figure 2:
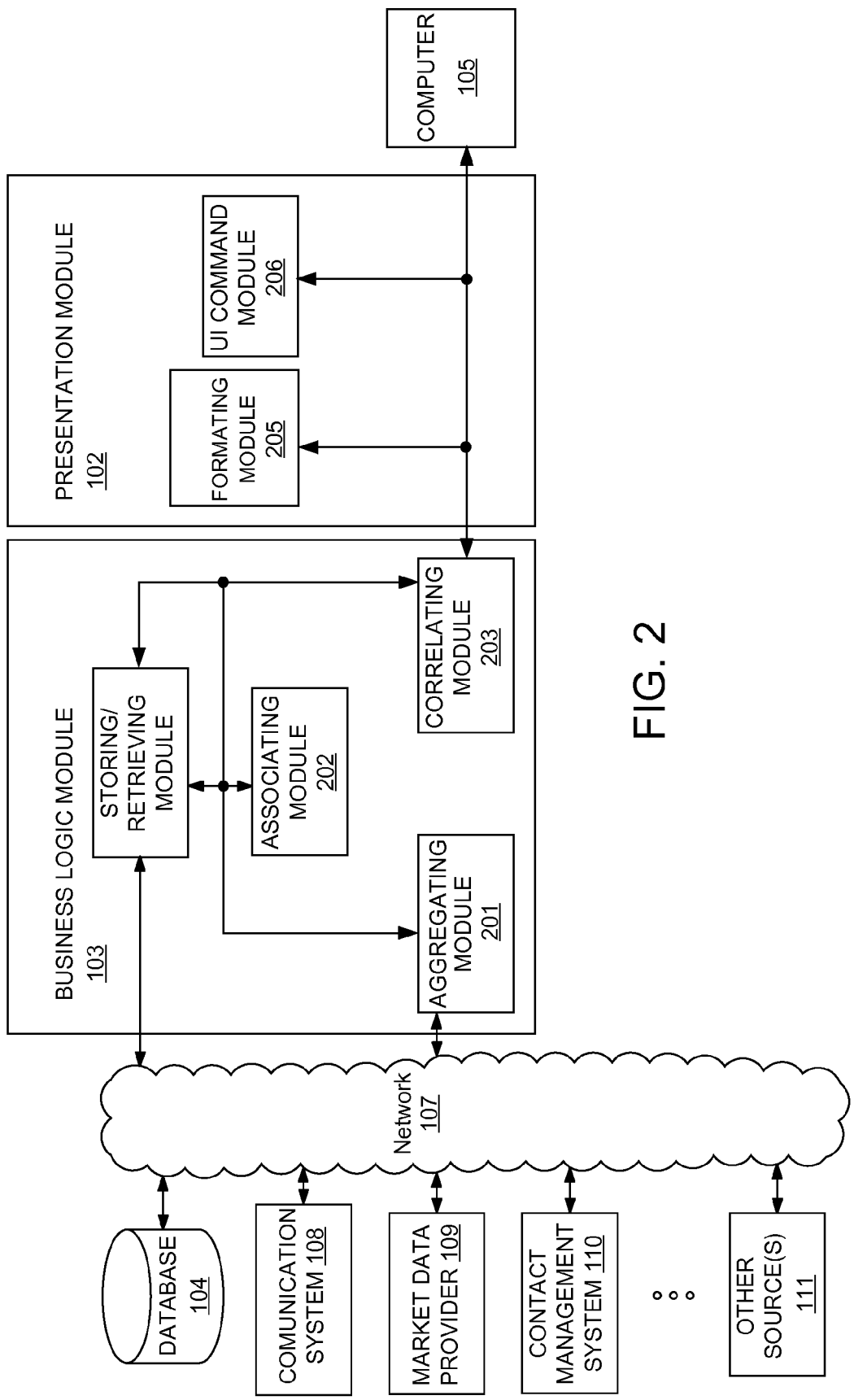
FIG. 2 is a block diagram illustrating a business logic module and a presentation module that may be used in accordance with various embodiments of the invention.

The particular types of data sources shown in FIGS. 1 and 2 should not be construed as limiting. Other data source(s) 111, such as order management systems and execution management systems, may be included in system 100 to provide server 101 with data, such as order history and recent transaction information.

Included in server 101 or located external to server 101, is a database 104 in which various types of data are stored. As described in further detail below with reference to FIGS. 2 and 3, the server 101 aggregates, associates, and correlates the data received from the one or more data sources 108-111 (e.g., communications data received from the communications system 108, market data received from the market data provider 109, contact data received from the contact management system 110, and/or other types of data received from other data source(s) 111), and stores the data in database 104.

Figure 3:
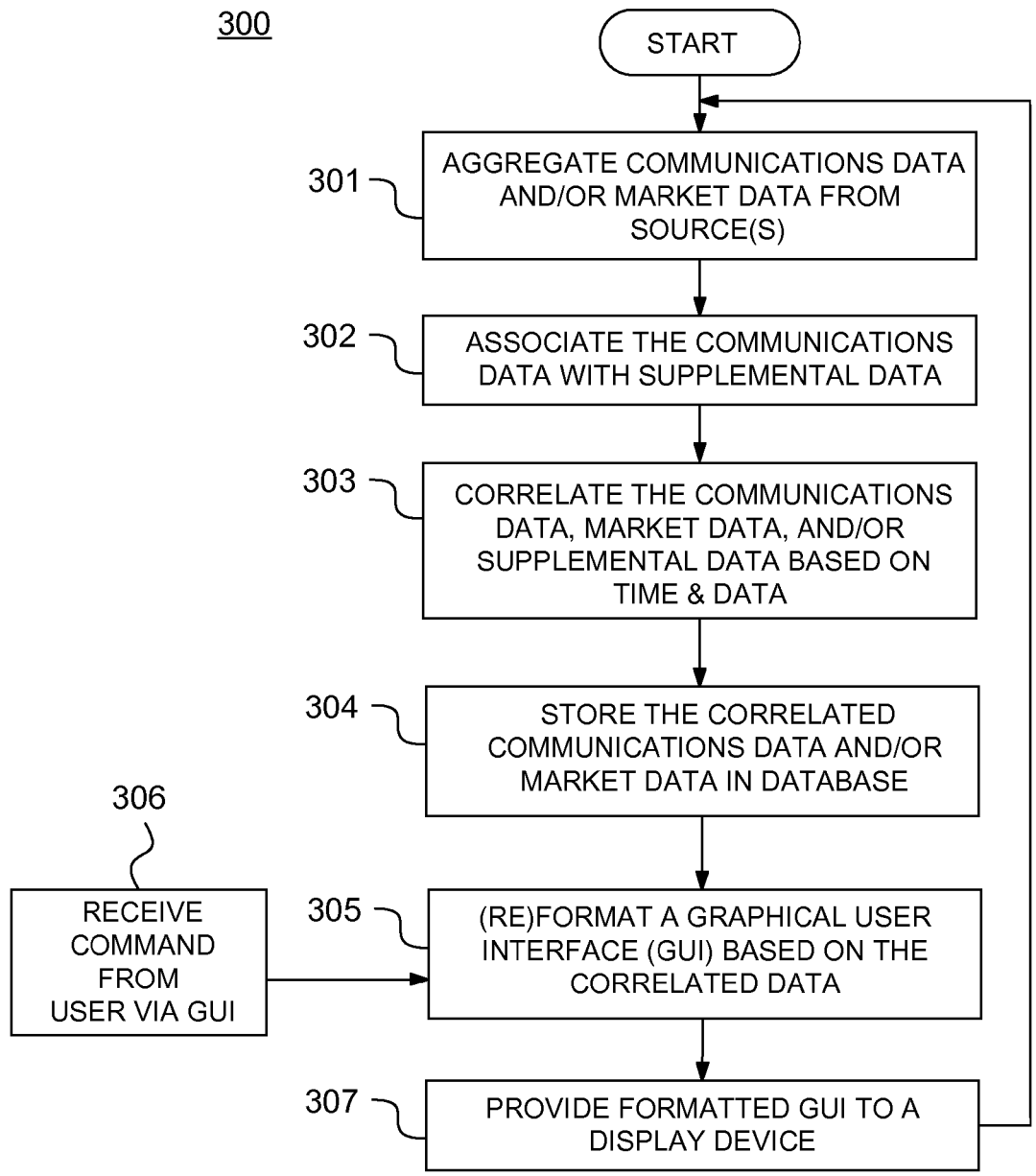
FIG. 3 is a flowchart diagram showing an exemplary procedure for providing a user interface in accordance with an example embodiment of the invention.

Also included in server 101 is a presentation module 102, which as described in further detail below with reference to FIGS. 2 and 3, presents a GUI displaying communications information, market information, and/or other relevant information to user 106 via computer 105. In particular, the presentation module 102 formats a graphical user interface (GUI) and provides the formatted GUI, via, for example, a communications network (not shown), to a display device, such as a display device of the computer 105. In one example embodiment, the computer 105 is part of a financial trading system, such as a trading turret, used by a head trader 106 who manages a trading desk associated with multiple other traders. As will be described in further detail below, with reference to FIGS. 4 through 15, the GUI provides, via computer 105, various real-time (or pseudo-real-time) and/or historical views of communications information and/or other relevant information (e.g., market information) in a manner that is easy to understand and to obtain new insights from.

A. Business Logic Module and Presentation Module

An example business logic module 103 and presentation module 102 that may be used in accordance with various example embodiments of the invention will now be described with reference to FIG. 2. As shown in FIG. 2, business logic module 103 includes an aggregating module 201, an associating module 202, a correlating module 203, and a storing/retrieving module 204. In general, the aggregating module 201 aggregates the data received from the one or more data sources 108-111. The associating module 202 associates the communications data received from the communications system 108 with supplemental data received from one or more of the other data sources 109-111. The correlation module 203 correlates the data received from the one or more data sources 108-111 based on one or more criteria (e.g., temporal data). The storing/retrieving module 204 stores the data received from the one or more data sources 108-111.

Presentation module 102 includes a formatting module 205 and a user interface (UI) command module 206. In general, the formatting module 205 formats the data received from the one or more data sources 108-111. The UI command module 206 receives commands or queries that were inputted into computer 105 via the GUI, and forwards the commands or queries to the formatting module 205.

IV. Process

FIG. 3 is a flowchart diagram showing an exemplary procedure 300 for providing a user interface in accordance with an example embodiment of the invention.

At block 301, the aggregating module 201 aggregates data received from the one or more data sources 108-111 via communication network 107. Example types of data aggregated by the aggregating module 201 include communication data, market data, supplemental data (e.g., contact data), etc. (as described in further detail above), although these examples should not be construed as limiting. According to one example embodiment, the aggregating module 201 aggregates communications data (e.g., history of communications between parties and/or trading desks, etc.). The aggregated data can be processed (e.g., associated, correlated, formatted, etc.) and presented in real-time (or pseudo-real-time), or can be stored in database 104 to be processed and presented, a later time, as historical data.

Optionally, according to another example embodiment, the aggregating module 201 aggregates market data (e.g., one or more stock price data feeds) received from one or more of the market data provider(s) 109. As shown in the example of FIG. 3, both options (i.e., the aggregating of communications data and of market data) are shown for convenience.

The aggregating module 201 also normalizes contact information using a communications handle (e.g., a phone number) as a key, from various systems including, for example, a CRM system, an OMS, etc. The aggregating module 201 then forwards at least a portion of the aggregated data to the associated module 202.

At block 302, the associating module 202 associates the aggregated communications data with supplemental data, such as contact data, received from one or more of the data sources 108-111. In one example embodiment, the associating module 202 associates the communications data with contact data (e.g., name, company, asset class of trades, value of trades at a particular time, a trading desk associated with a telephone number) that is received from a Customer Relationship Management (CRM) system, an Order Management System (OMS), a company directory (e.g., using Lightweight Directory Access Protocol (LDAP)), and/or a Personal Directory (e.g., from Microsoft™ Outlook™).

Whereas some communications data may indicate only high level call details (e.g., that a telephone call lasting five minutes originated from phone number A to phone number B), the communications data may be associated with corresponding contact data received from the contact management system 110, to indicate more detailed information (e.g., that the telephone call originated from a person named D, who is a seller of gold at bank E, to a person named F, who is a buyer of gold at bank G).

After associating the data as described above, the associating module 202 then forwards at least a portion of the associated data to the correlating module 203. At block 303, the correlating module 203 correlates the aggregated communications data based on one or more criteria, such as temporal data (e.g., a start or end time of a communication), a tag (e.g., a name of a party to a particular communication), a query, and/or a command. In one example, the correlating module 203 mines the communications data for any corresponding temporal data. The correlating module 203 then uses the temporal data as an index or key for chronologically correlating the aggregated communications data, associated supplemental data, and/or the aggregated market data. The correlating module 203 then forwards at least a portion of the correlated data to the storing/retrieving module 204.

Optionally, according to another example embodiment, the correlating module 203 correlates aggregated market data based on one or more criteria, such as aggregated communications data, supplemental data, temporal data (e.g., a time associated with a particular stock price), a tag (e.g., a ticker symbol of a particular stock), a query, and/or a command.

At block 304, the storing/retrieving module 204 stores at least a portion of the data received from the one or more data sources 108-111. The stored data may be in raw form (i.e., in the same form as received from the one or more data sources 108-111), and/or in a form outputted by one of the aggregating module 201, the associating module 202, and/or the correlating module 203.

Once stored in database 104, the data is available to be retrieved by the formatting module 205 for formatting (block 305) into a GUI. Alternatively, the formatting module 205 may format data (block 305) into a GUI as it is received from one or more of the other modules 201-23 (i.e., in real-time or pseudo-real-time). In general, the GUI is formatted so as to present views to user 106 that enable easy digestion of complex and varying data sets.

Once correlated, the communications data can be displayed via a GUI in a time-based manner. For example, as described in further detail below, the communications data can be presented via the GUI as a synchronized timeline. Also, the communications data can be presented via the GUI as a time-based aggregate or average (e.g., total calls per day, average call duration, etc.).

Optionally, according to another example embodiment, once market data is correlated, the market data can be displayed via the GUI in a time-based manner. For example, as described in further detail below, the market data can be presented via a GUI as a synchronized timeline. Also, the market data can be presented via the GUI as a time-based aggregate or average (e.g., total order volume per day, average order amount per day, etc.).

The GUI is interactive in that it displays GUI elements (defined above), which the user 106 may interact with to cause the GUI to display different views and/or information. The user's 106 selecting of a GUI element causes one or more commands (or queries) to be transmitted via the GUI. At block 306, the UI command module 206 receives such a command or query inputted into computer 105 by the user 106 via the GUI. The UI command module 206 forwards the received command or query to the formatting module 205, causing the formatting module 205 to reformat the GUI based on the command, the query, and/or the correlated data. For example, in one embodiment, the formatting module 205 performs a lookup in the database 104 of one or more tags (defined above) associated with the received command or query, and reformats the GUI to display information associated with the tag(s) identified via the lookup. Example GUIs, as well as various types of commands queries that the user 106 can input (e.g., filtering, association of different data types, playback, etc.), are described in further detail below with reference to FIGS. 4-15.

Once the data is formatted by the formatting module 205, the formatting module 205 provides (block 307) the formatted (or reformatted) GUI to a display device, such as, for example, a display device of the computer 105. The data displayed via the GUI may be updated and displayed in a real-time (or pseudo-real-time) manner. Alternatively, or in addition, the data displayed via the GUI may be historical data retrieved from the database 104.

V. Example GUIs

Example GUIs that may be used in accordance with various example embodiments of the invention will now be described with reference to FIGS. 4-15.

Figure 4:
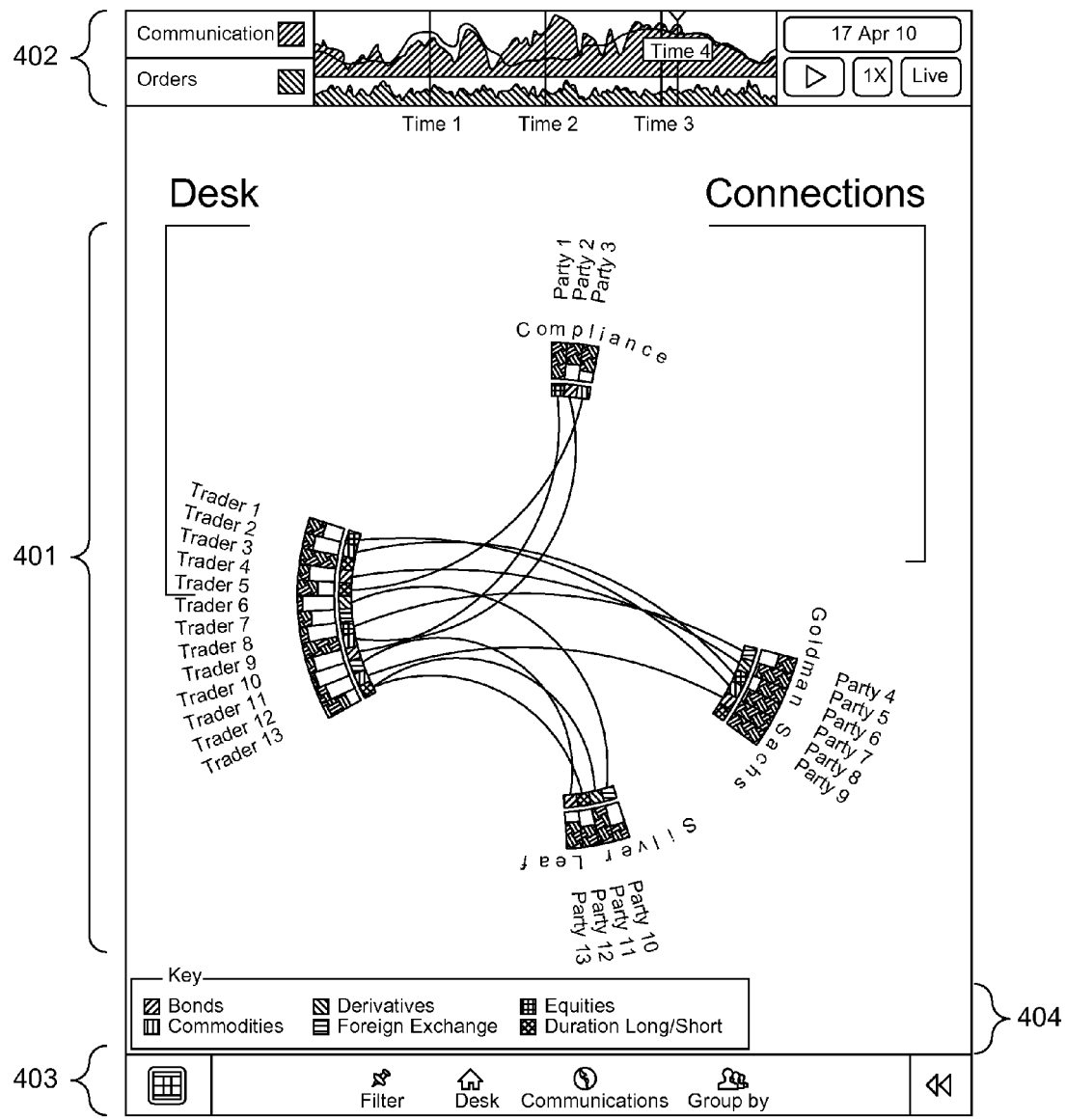
FIG. 4 is a representative view of an example user interface in accordance with an example embodiment of the invention.

FIG. 4 is a representative view of an example GUI in accordance with an example embodiment of the invention. In general, the GUI presents a real-time, pseudo-real-time, and/or historical view of communication activity of a trading desk, market information, as well as other related information. In general, the various data and/or information described herein as being displayed in the following example GUIs is received by the server 101 from the one or more data sources 108-111 described above.

The various GUIs described herein are interactive in that they display various GUI elements, which the user 106 may interact with to cause the GUIs to display different views and/or information. Specific example GUI elements are described herein for convenience only, and should not be construed as limiting. Various other types of GUI elements are contemplated, such as, for example, GUI elements enabling a user to input a selection (e.g., a command, a query, a time, a date, etc.) by using a textual format and/or a graphical format. Also, although the description herein refers to specific example soft buttons, this should not be construed as limiting. For instance, other example embodiments are contemplated, where one or more of the button(s) described herein is replaced with a hard button, such as a physical button externally attached to the computer 105.

In one example embodiment, a GUI has a default arrangement, such as the arrangement of FIG. 4, that is displayed upon the GUI application being opened by the user 106 via the computer 105. The particular naming and arrangement of the elements of the GUIs described herein are provided for convenience and should not be construed as limiting.

A. Communication Diagram

In approximately the center of the GUI shown in FIG. 4 is a circular image which depicts a communication diagram according to one aspect of the embodiments described herein. In general, the communication diagram illustrates traders of a trading desk on one side, other parties on another side, and lines representing communications between the traders and the other parties. The communication diagram also illustrates other information, as described in further detail in the sections that follow.

1. Traders & Other Parties

Displayed on the left side of the communication diagram shown in FIG. 4, in section 401, is a curved image that represents a trading desk, along with traders associated with the trading desk, and other information (e.g., call volume) associated with the traders. Displayed on the right side of the communication diagram shown in FIG. 4, in section 401, is a curved image that represents other parties (which may also be referred to herein as "connections"), such as buyers or sellers, that the traders of the trading desk communicate with. As shown in FIG. 4, the other parties may be grouped based on predetermined criteria, such as which entity or group (internal or external) each connection is associated with (e.g., compliance department, Goldman Sachs™, etc.), which asset class each connection is associated with, etc. Each connection may be associated with an external entity (such as a particular bank) or an internal entity (such as a department within the same entity to which the trading desk belongs).

2. Communications

Displayed about the center of the communication diagram are communication lines that illustrate active communications (e.g., an active telephone call, instant message traffic, email activity, etc.) between the traders and the other parties. In particular, each line connects one or more trader(s) to one or more other party(ies) the trader is communicating with, thereby representing a communication between the one or more traders and the one or more other parties. In one example embodiment, each communication line is visible throughout a time window during which the corresponding communication is active.

The communication diagram is time-based in that it displays communications occurring at a particular time or during a particular time window. In one example embodiment, a cursor in the timeline (described below) shown in section 402 of FIG. 4 indicates the time (or time window) for which the communication diagram is displaying communications.

The communication line(s) that represent communications are not limited to any particular format. In one example embodiment, one or more characteristics of each communication line indicate additional information regarding the corresponding communication. For example, the lines may be of a particular color, width, and/or pattern (e.g., dotted, dashed, and/or the like) to indicate a duration of the communication, an asset class of the communication, a volume of a trade associated with the communication, and/or the like. In another example embodiment, the line presented by the GUI is tapered in order to illustrate a direction of the communication (i.e., which party initiated the call). For example, the line may appear wider near the originator of the communication and then appear narrower near the receiver of the communication.

3. Revenue

In addition to the information described above, the communication diagram also displays additional information, such as information associated with each trader, other party, and/or communication. In particular, adjacent to the image representing each trader and each other party are one or more indicators of information associated with the trader, the other party, and/or the communication between the trader and the other party. Examples of such additional information include revenue, call volume, and asset class, but these examples should not be construed as limiting.

A revenue (e.g., revenue per quarter) associated with each other party is indicated in FIG. 4 via a bar chart that appears adjacent to each other party, respectively, in the communication diagram, although this example should not be construed as limiting. In other examples, the indicator can take other forms, such as a numerical indicator, an indicator based on color, etc. In one example embodiment, the revenue (e.g., revenue per quarter) associated with a particular other party is determined by retrieving such information from a predetermined profile of the other party.

4. Call Volume

Figure 5:
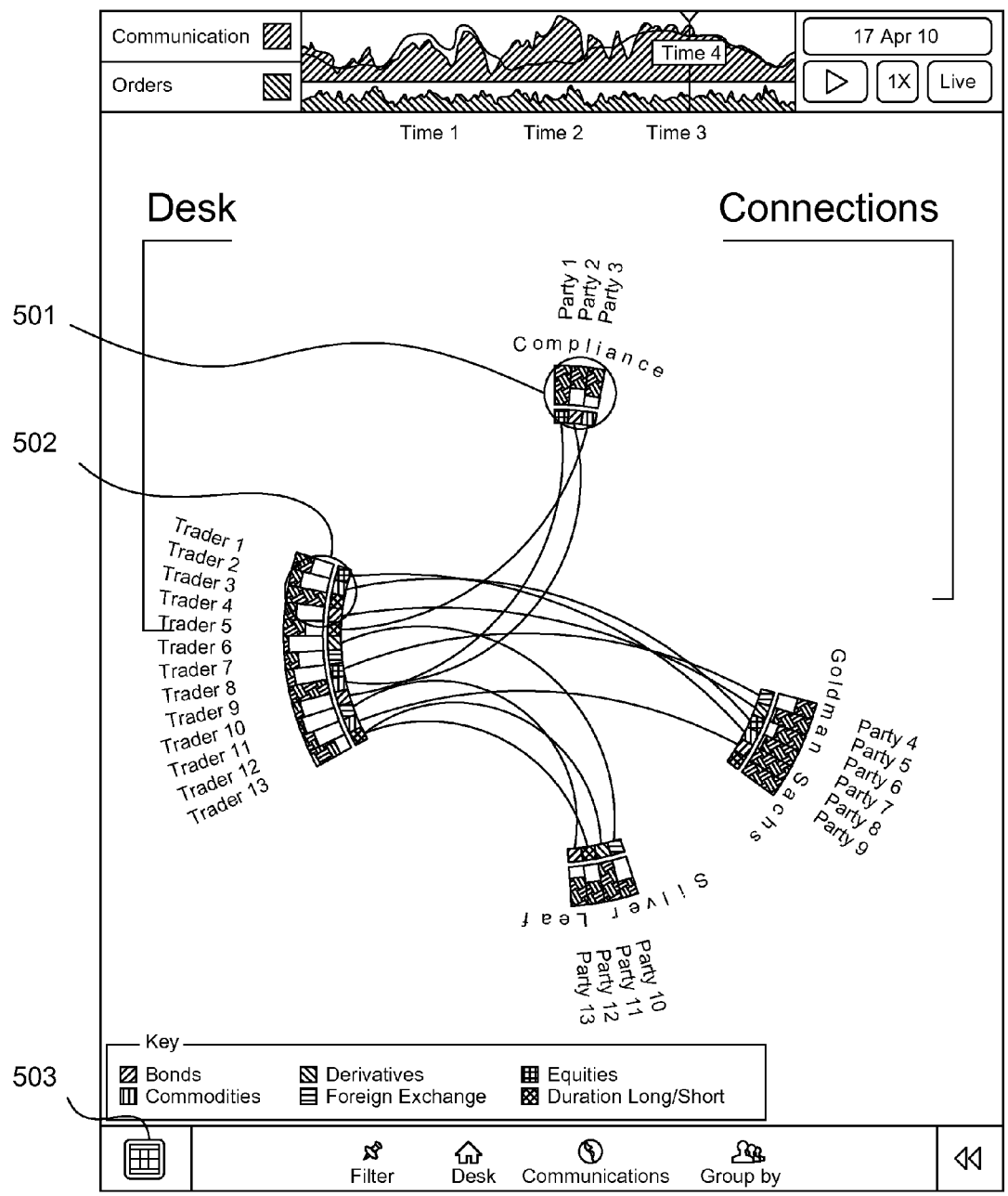
FIG. 5 is a representative view of another example user interface in accordance with an example embodiment of the invention.
Figure 6:
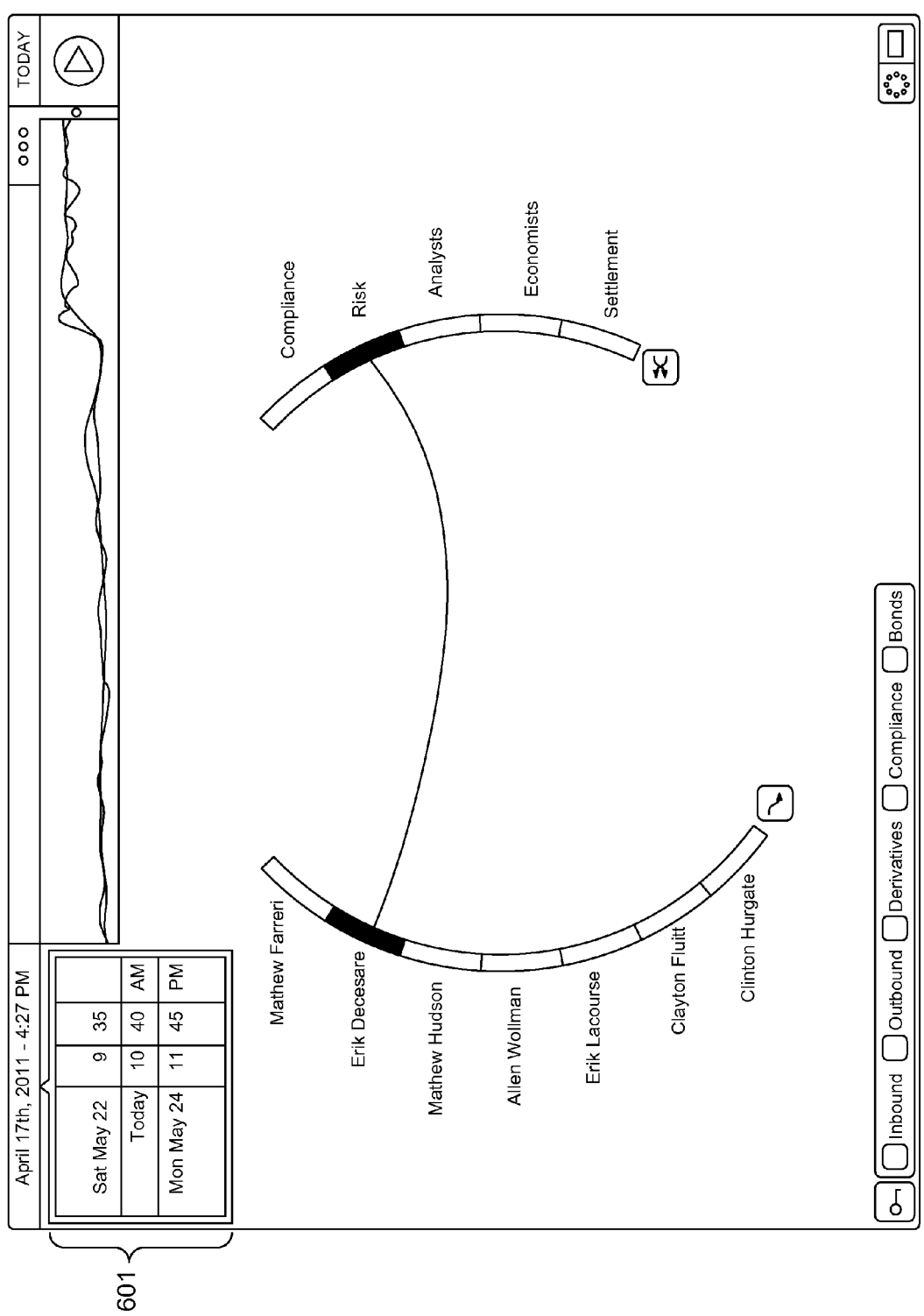
FIG. 6 is a representative view of still another example user interface in accordance with an example embodiment of the invention.

Call volume (e.g., aggregated across a predetermined time period) of each trader of the trading desk is shown in the communication diagram via a bar chart that appears adjacent to each trader (e.g., in section 502) of FIG. 5 in the communication diagram, although this example should not be construed as limiting. In one example embodiment, as the call volume for a particular trader increases communication increases, the call volume bar grows taller and becomes a brighter color making it more visually prominent. In other examples, the call volume indicator can take other forms, such as a numerical indicator, an indicator based on color, etc. In one example embodiment, the call volume associated with each trader is retrieved computed based on call data retrieved from call records stored in a database in association with each trader. The call volume indicators of the GUI enable the user 106 to quickly identify both high call volume traders and low call volume traders.

5. Asset Class

Asset class associated with each communication is indicated by a characteristic (e.g., color, pattern, shape) of a symbol that terminates the connection line corresponding to the communication. For example, in section 502 of FIG. 5, the asset class associated with each communication is indicated by squares of a different color (or other characteristic) at the termination of each communication line. In one example embodiment, a key, such as the key 404 shown in FIG. 4, indicates which symbol characteristics correspond to which particular asset class.

In another example embodiment, the asset class associated with a particular party is determined by retrieving such information from a predetermined profile of the party stored in database 104 or received from the one or more data sources 108-111. The asset class associated with a particular communication is determined by performing an automated keyword analysis of the communication and comparing the keywords obtained from the analysis to a predetermined list of keywords associated with particular assets, in accordance with another example.

B. Timeline

In addition to the communication diagram, displayed in the GUI of FIG. 4 is a timeline (section 402) illustrating one or more types of data (e.g., communication volume and order volume) received from the one or more data sources 108-111 over time via the communication network 107. Displaying communication volume and market and/or order volume in a time-synchronized manner enables the user 106 to quickly notice possible relationships between communications of the trading desk and market activity, or the amount of orders being placed.

The user 106 may interact with the timeline in various ways. On the right side of the GUI in section 402 is a play button (indicated by a button displaying a triangle symbol) that is selectable to start and stop playback of historical communications and/or other types of data (e.g., market data). Near the play button is a playback parameter button (indicated in section 402 by a button displaying the currently selected playback parameter, 1×) that is selectable to toggle between playback at a predetermined rates (e.g., 0.5× (half-speed), 1× (normal rate), 2× (double-speed), rewind, fast forward, etc. Near the playback parameter button is a live/historical playback button (indicated in section 402 by a button displaying the currently selected playback mode, live) that is selectable to toggle between live (i.e., real-time or pseudo-real-time) playback and historical playback of the data in the timeline. The timeline can also be navigated by dragging a cursor from left to right to select a particular date and/or time of interest.

In one example embodiment, clicking on the date in the top right corner of section 402 of the GUI causes a date picker to be presented. The date picker acts as a control that allows a user to input date and time information in either a textual or graphical format. The date picker could be used to select different dates to navigate the timeline to. The date may be entered via a scrollable date GUI element such as the GUI element shown in section 601 of FIG. 6, in one example.

The timeline also enables the user 106 to analyze communications that take place in response to a past event. For example, the user 106 can navigate the timeline backward to a time of a key past event (e.g., a rate announcement made by the U.S. Federal Reserve at 2:00 PM of the current day). In particular, the user 106 may use the timeline on the top of the GUI in section 402 to scroll back to the point in time that the user 106 is interested in. As the user 106 navigates to an earlier point in time via the timeline in section 402 of FIG. 4, the active connections in the visualization are automatically updated. The timeline may indicate that, shortly after the 2:00 PM rate announcement, there was a spike in communication and order volume. This enables the user 106 to analyze how the traders of the trading desk respond to events, and particularly what communications the traders engage in response to such events. This, in turn, enables the user 106 to gauge the efficiency of the traders and/or improve the efficiency of the trading desk by, for example, replacing less efficient traders with more efficient traders.

C. Summary Button

Figure 7:
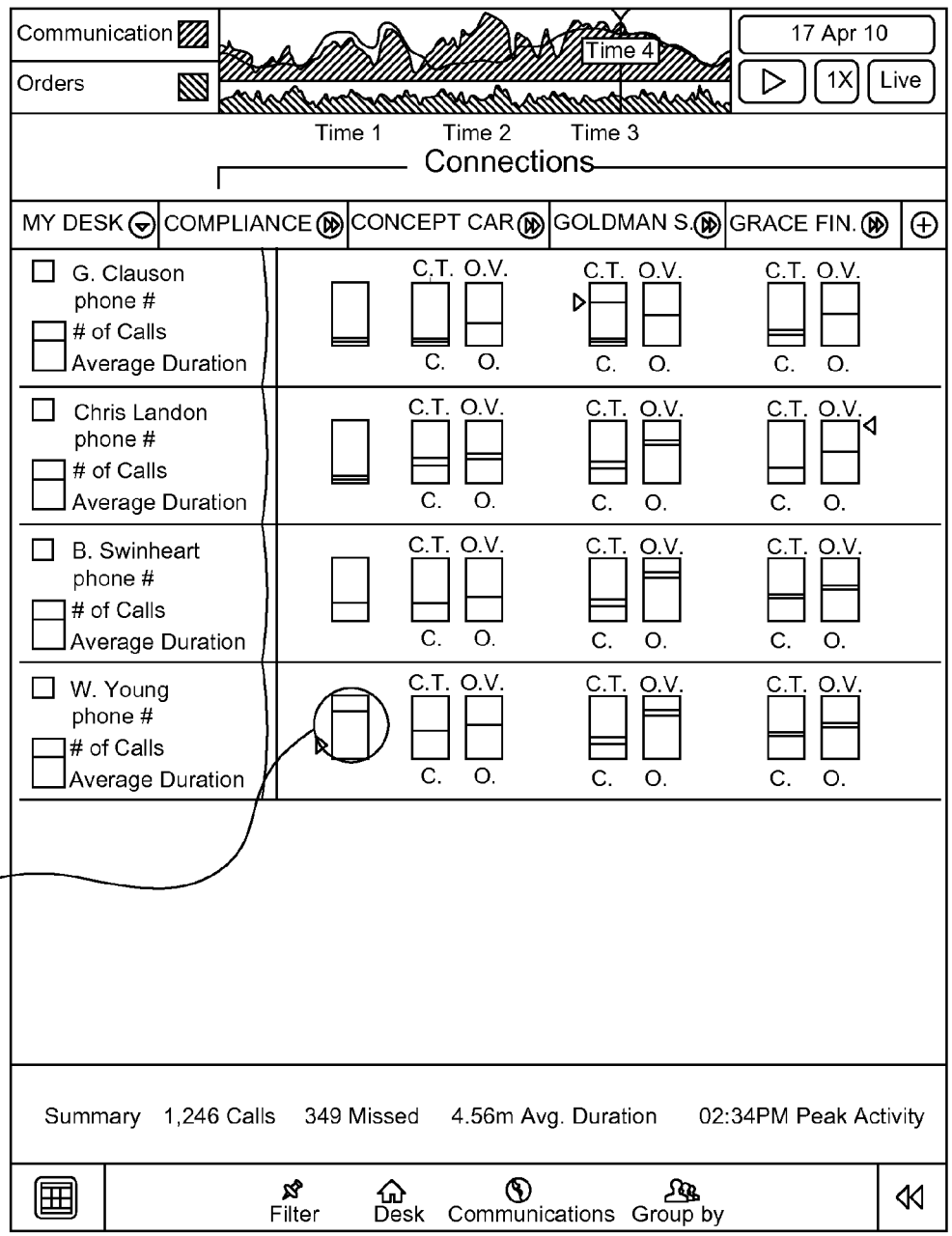
FIG. 7 is a representative view of an additional example user interface in accordance with an example embodiment of the invention.

Selecting the summary button 503 (FIG. 5) of the GUI, causes the GUI to display a summary view, such as the summary view shown in FIG. 7. The summary view of FIG. 7 includes rows respectively corresponding to each of the traders, and columns respectively corresponding to groups of connections. Beneath each trader, the summary view of the GUI of FIG. 7 displays details associated with the trader, such as, for example, an amount of calls placed during a predetermined time period (e.g., a single workday), a phone number of the trader, an average duration of each call the trader engages in, and/or the like. Beneath each column, which corresponds to particular group of connections, the GUI displays an indicator of an aggregate amount of calls and/or orders between each trader and the parties of the corresponding group of connections.

The summary view also displays information (e.g., communications information, market information, etc.) arranged in an array with each entry corresponding to a particular trader and a particular connection. Each entry of the array in the summary view indicates one or more types of information associated with the trader and the connection in that row and column, respectively. For example, as shown in FIG. 7, each entry can include a bar chart indicating and amount of call volume between the corresponding trader and connection, as well as a bar chart indicating an order volume associated with the corresponding trader and connection. In one embodiment, each trader's daily average call volume or order volume is indicated by a horizontal line (e.g., a red line) in each bar chart corresponding to the call volume or order volume, respectively. The summary view enables the user 106 to, for example, view which of the traders has spent the most time on the phone with compliance (element 701 of the GUI).

Figure 8:
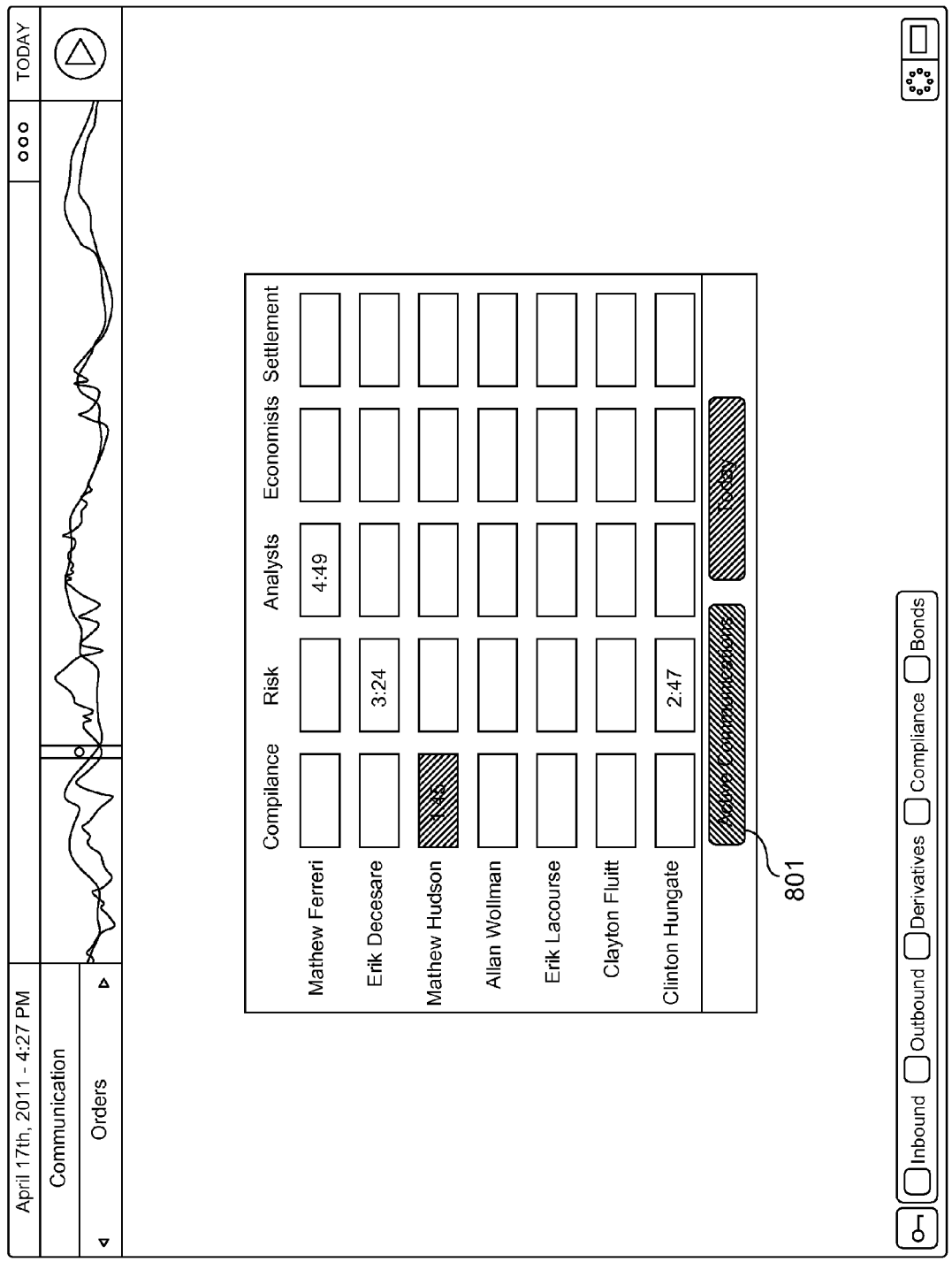
FIG. 8 is a representative view of a further example user interface in accordance with an example embodiment of the invention.
Figure 9:
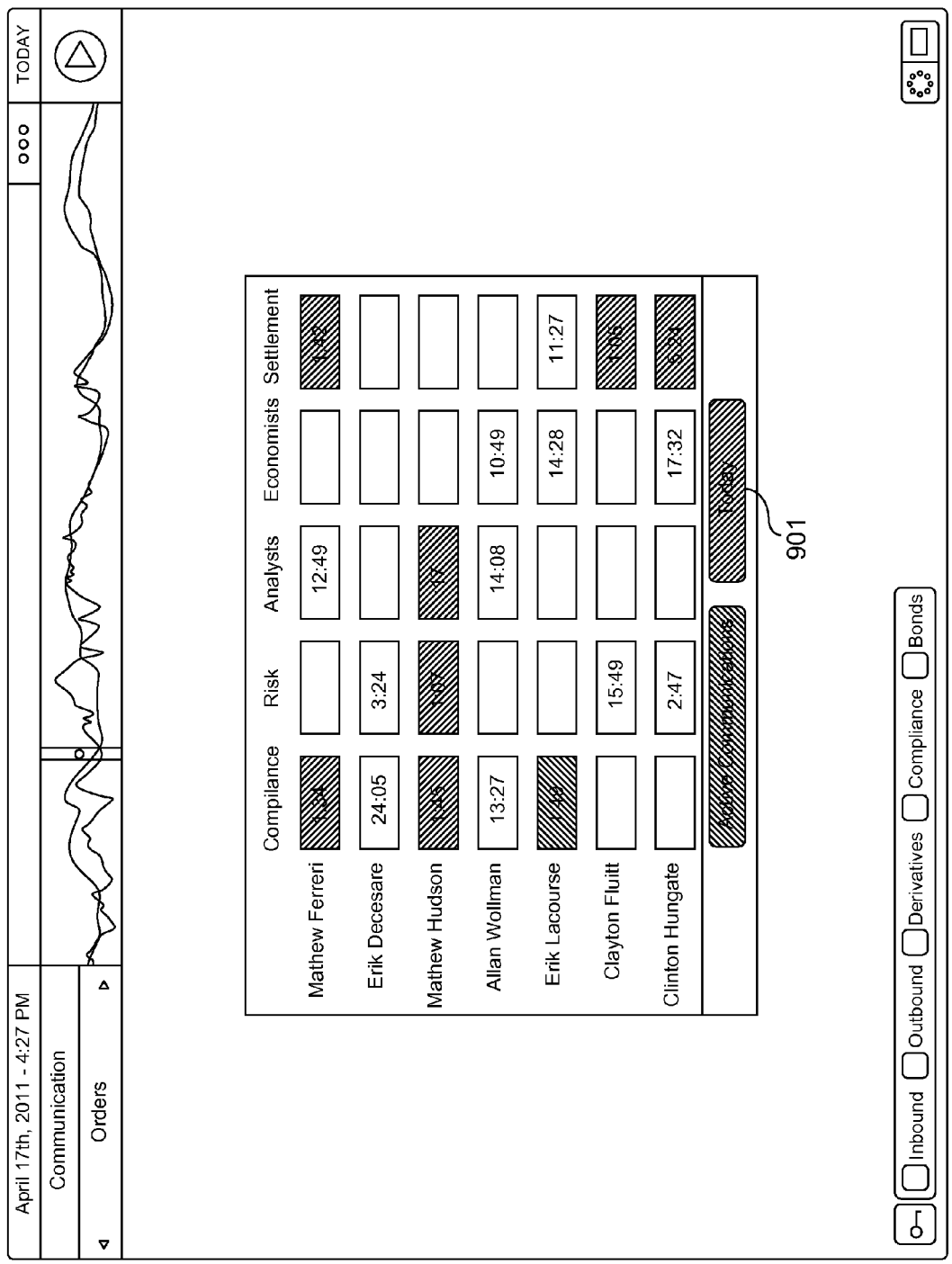
FIG. 9 is a representative view of yet another example user interface in accordance with an example embodiment of the invention.

FIGS. 8 and 9 illustrate additional examples of GUIs that are displayed in response to the user 106 selecting the summary button 503 (FIG. 5). In FIG. 8, the user 106 may select an active communications button (section 801) to cause the GUI to display how long each trader on their desk has had an active connection. As shown in FIG. 9, the user 106 may select a today button (section 901) to cause the GUI to display cumulative connection time for each trader, for instance, to enable the user 106 to quickly determine which trader has been communicating with the compliance back office the most.

D. Other Controls

In addition to the communication diagram and the timeline, displayed in FIG. 4 (sections 402 and 403) are multiple controls (i.e., interactive GUI elements) that enable the user 106 to select various information to be displayed by the GUI in various ways. The particular naming and arrangement of these buttons shown in the various figures described herein should not be construed as limiting. Section 402 includes a benchmarks button (indicated by a button displaying the currently selected benchmark, orders), and section 403 includes a filter button, a desk button, a connections button, a group by button, and a summary button. Each of these buttons will now be described with reference to various Figures.

1. Benchmarks Button

Figure 10:
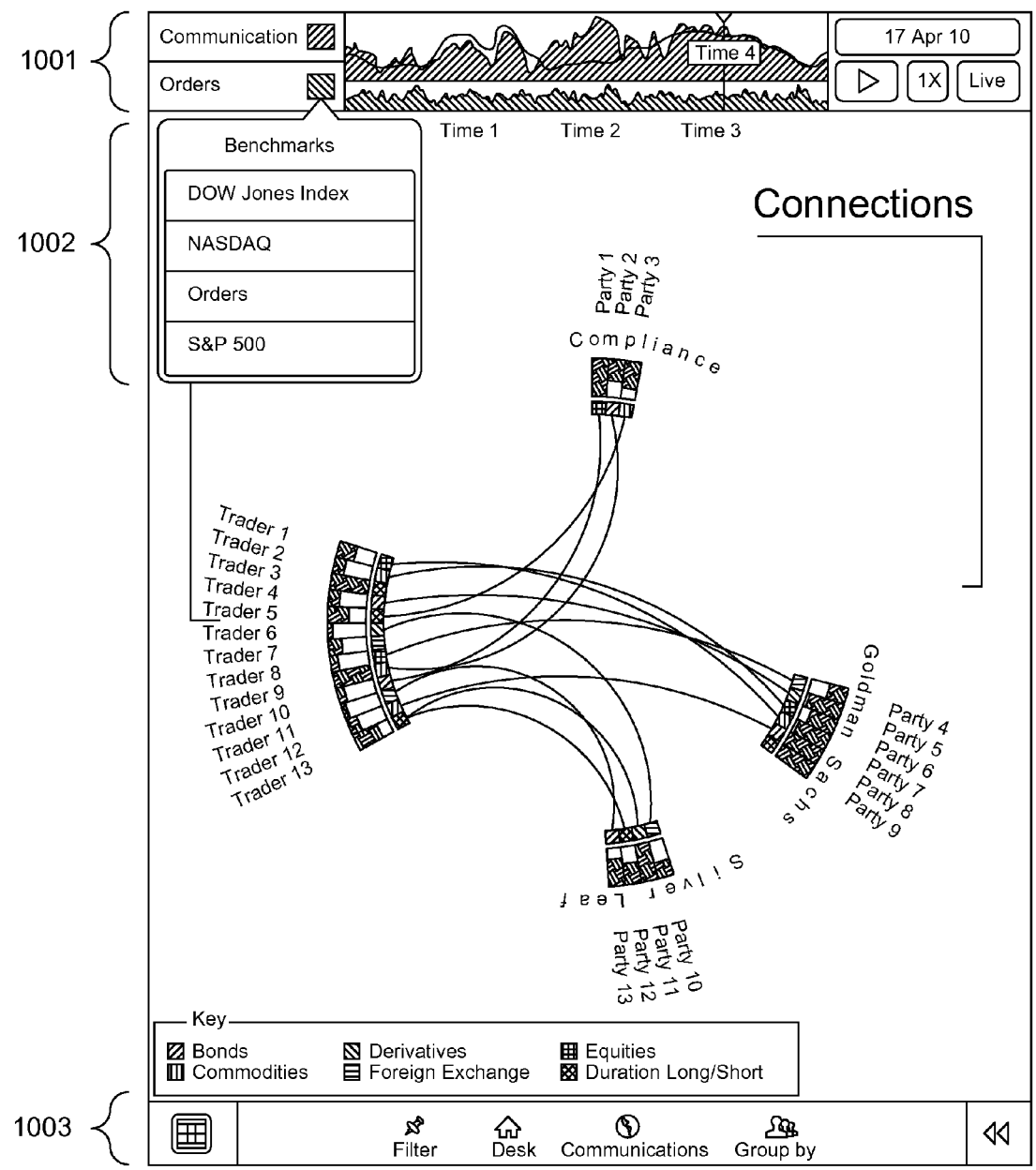
FIG. 10 is a representative view of an additional example user interface in accordance with an example embodiment of the invention.

When the user 106 selects the benchmarks button in section 1001 of FIG. 10, this causes the GUI to display a benchmarks menu, such as the benchmarks menu shown in section 1002 of FIG. 10. The user 106 may select, via the benchmarks menu, one or more benchmark options, to cause the GUI to display the benchmark (e.g., other market related information) associated with the selected benchmark option. Once displayed, the benchmark may be used as a basis of comparison against communications data.

Example benchmarks options include financial exchange indexes (e.g., the Dow Jones Industrial Average™ Index, the NASDAQ™ index, the S&P 500™ index, etc.), as well as an orders benchmark option. Selecting a financial exchange index, for example, the NASDAQ™ Index benchmarks option, causes the GUI to display, in the timeline in section 1001 of the GUI, the performance of the NASDAQ index over a period of time covered by the timeline. Selecting the orders benchmarks option causes the GUI to display, in the timeline in section 1001 of the GUI, the amount of orders placed over a period of time.

The specific benchmarks options shown in FIG. 10 should not be construed as limiting. Other benchmarks options, such as, for example, other financial exchange indexes, a benchmark associated with customer sentiment, and/or the like, can be included in the benchmarks menu.

The selected benchmark(s) may be displayed as an overlay of the communication data in the timeline of section 1001, or above or below the communication data in the timeline of section 1001. The one or more benchmarks displayed via the GUI may be utilized by the user 106 as a reference against which the communications of the trading desk may be analyzed.

2. Filters Button

Figure 11:
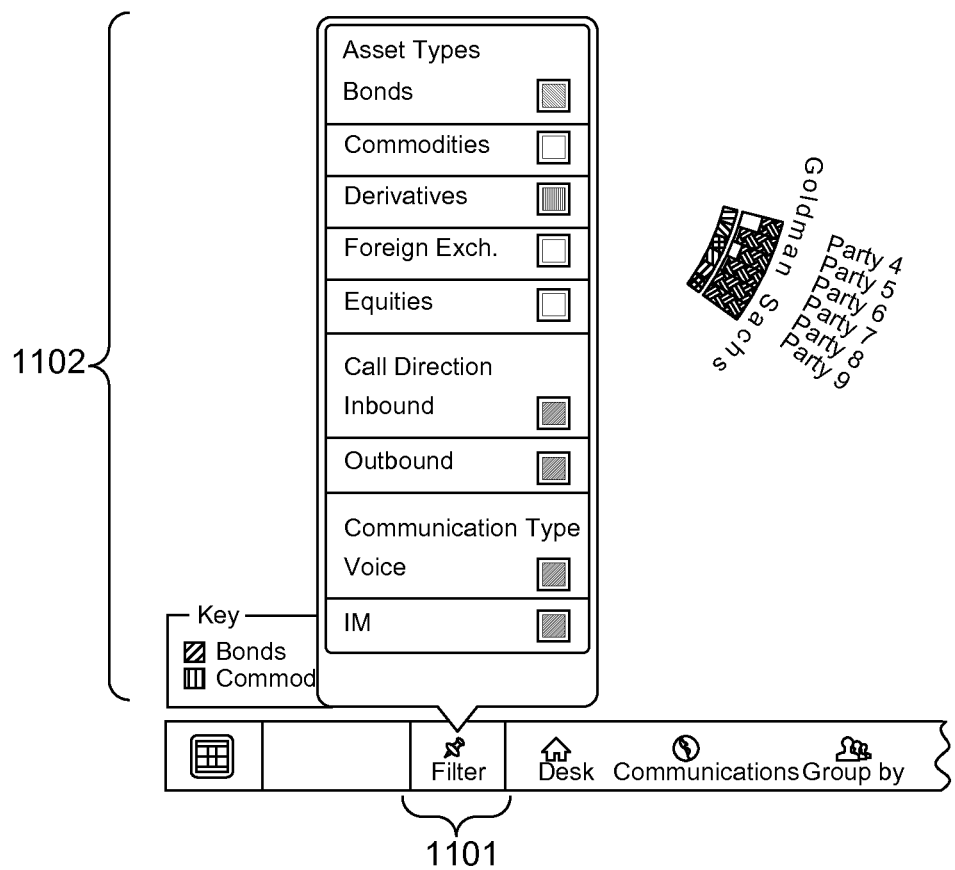
FIG. 11 is a representative view of a further example user interface in accordance with an example embodiment of the invention.

When the user 106 selects the filters button in section 1101 of the GUI, this causes the GUI to display a filter menu, such as the filter menu 1102 shown in FIG. 11. As shown in FIG. 11, the user 106 may select, via the filter menu 1102, one or more filter options to filter the data presented via the GUI based on predetermined criteria. Each filter option is categorized into a filter category. Example filter categories include asset types, call direction, and communication type.

Example filter options in the asset types category include bonds, commodities, derivatives, foreign exchanges, equities, etc. Example filter options in the call direction category include inbound and outbound. Example filter options in the communication types category include voice call, instant message, etc. When the user 106 selects an asset type filter option, such as bonds, this causes the GUI to display, via the communication diagram, timeline, and/or summary view (depending on which view is being displayed) information relating to that particular asset type (e.g., bonds). When the user 106 selects a call direction filter option, such as outbound, this causes the GUI to display, via the communication diagram, timeline, and/or summary view information relating to that asset type (e.g., outbound calls, with respect to the trading desk). When the user 106 selects a communication type filter option, such as voice calls, this causes the GUI to display, via the communication diagram, timeline, and/or summary view information relating to that communication type (e.g., voice calls).

In another example embodiment, the GUI can be used to playback and identify trends and potential new financial instruments. The user 106 can analyze communications between different asset classes within an organization. By looking at the communications between asset classes in detail, interesting and unexpected patterns of communications may be explored and investigated further to determine if the output of these communications between these asset classes represents a bespoke deal that can be productized and sold to a larger client base.

3. Desk Button

When the user 106 selects the desk button shown in section 1003 of FIG. 10, this causes the GUI to display information relating to connections of the trading desk. In one example, when the desk button is selected, a filter is enabled thereby causing the GUI to display communications associated with the trading desk that a trader is a member of, or that a head trader 106 oversees. In another example embodiment, selecting the desk button in section 1003 of the GUI causes the GUI to display a menu that enables the user 106 to select one or more additional views, such as an institutional view. In another example, when the desk button is selected, a filter is enabled thereby causing the GUI to display communications associated with an entire institution including multiple trading desks, not necessarily just a single trading desk.

4. Connections Button

Figure 12:
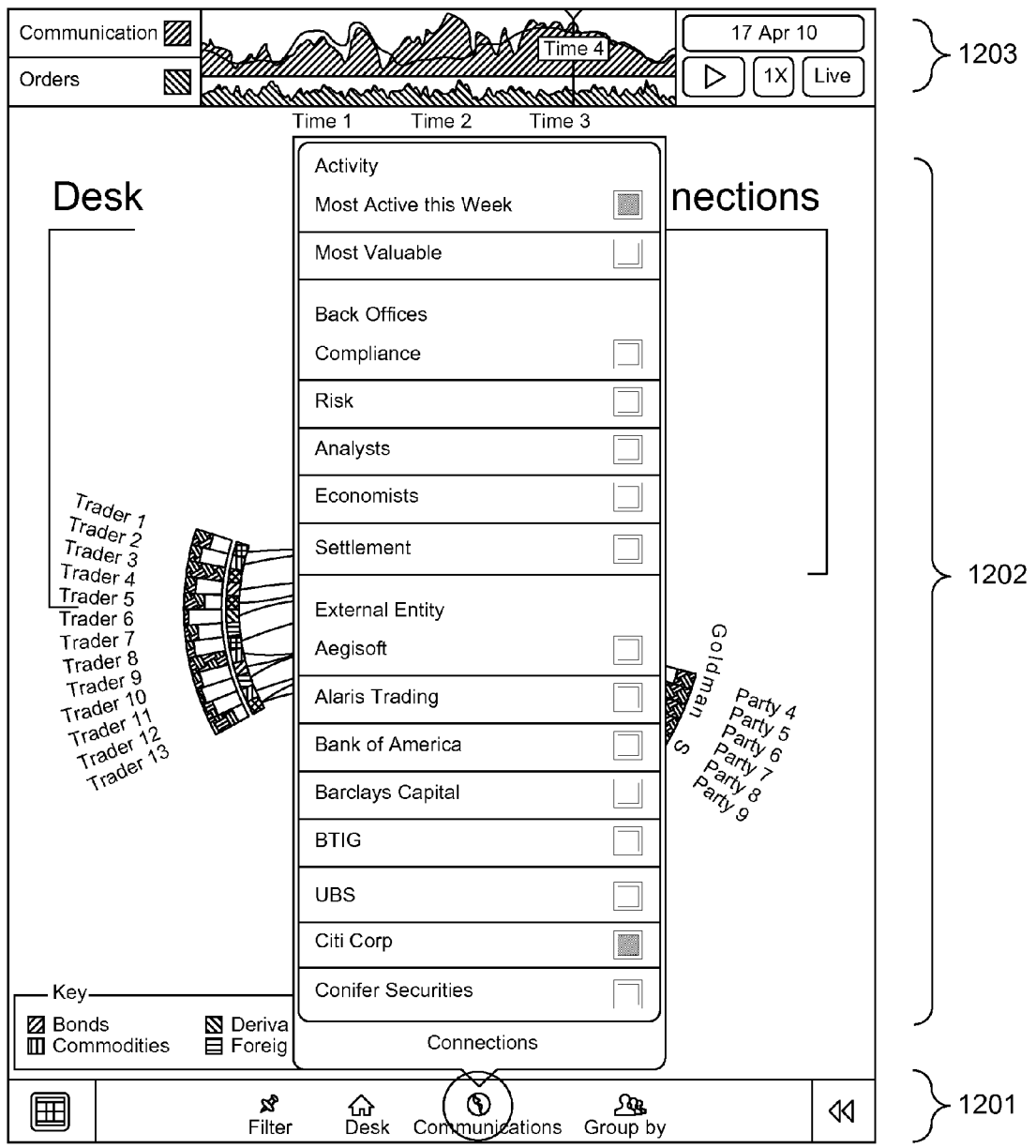
FIG. 12 is a representative view of still another example user interface in accordance with an example embodiment of the invention.
Figure 13:
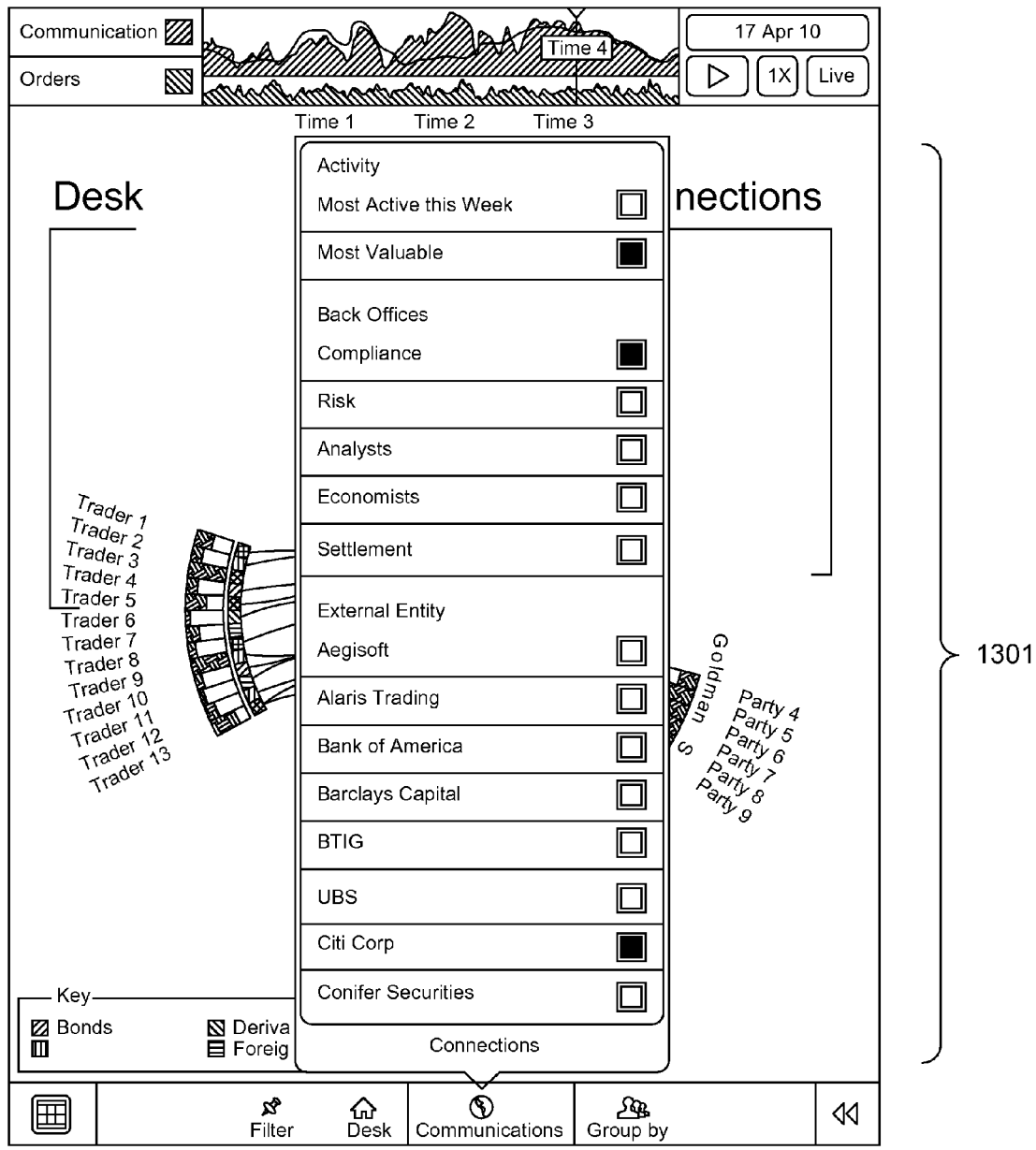
FIG. 13 is a representative view of an additional example user interface in accordance with another example embodiment of the invention.

When a user 106 selects the connections button in section 1201 of FIG. 12, this causes the GUI to display a connections menu, such as the connections menu shown in section 1202 of FIG. 12. The user 106 may select, via the connections menu, one or more connections options each associated with predetermined criteria, thereby causing the GUI to display only connections that meet the predetermined criteria.

In one example embodiment, when a user 106 selects a particular connections option via the connections menu, the GUI displays the connection(s) associated with the selected connections option, and does not display the connection(s) not associated with the selected connections option. In another example embodiment, when the user 106 selects a particular connections option via the connections menu, the GUI continues to display connections not associated with the selected connections option, but deemphasizes (e.g., by graying out) all connections except the connection(s) (i.e., other parties) that are associated with the selected connections option.

Each connections option is categorized into a connections category. Example connections categories include an activity category, a back office category, and an external entities category, each of which will now be described in further detail.

a. Activity

In general, selecting a connections option in the activity category causes the GUI to display, via the communication diagram, timeline, and/or summary view (depending on which view is being displayed), connections associated with a predetermined amount of activity or value. As shown in FIG. 12, (1202), connections options in the activity category include, for example, most active this week, most valuable, and the like. Selecting the most active this week connections option causes the GUI to display a predetermined number of connections associated with the most activity during the current week, with activity measured by, for example, number of trades per week. Selecting the most valuable connections option causes the GUI to display a predetermined number of the most valuable connections, with value measured by, for example, revenue produced per quarter. In the example shown in FIG. 12, the user 106 has selected the most active this week connections option. The particular connections options in the activity category shown in FIG. 12 should not be construed as limiting. For example, other activity options, such as, most active today, most active this month, etc., can also be included as connections options in the activity category.

In one example, the user 106 may utilize the connections options in the activity category to analyze the trading desk's reaction to a past event of particular interest (e.g., a rate announcement made by the U.S. Federal Reserve at 2:00 PM of the current day) to ensure the most valuable contacts were contacted expeditiously. For example, the user 106 can select the most valuable connections option and then use the timeline in section 402 of FIG. 4 to navigate back to the time of interest (e.g., 2:00 PM). The user 106 can then select the play button thereby causing the GUI to display the communications that occurred shortly after the 2:00 PM announcement. The user 106 may then analyze the communications more closely by pausing the application or slowing down the playback using the playback parameter button (described above).

b. Back Offices

In general, selecting a connections option in the back offices category causes the GUI to display, in the communication diagram, timeline, and/or summary view (depending on which view is being displayed), connections (i.e., other parties) associated with a predetermined back office. As shown in FIG. 12 (1202), connections options in the back office category include, for example, compliance, risk, analysts, economists, and settlement. Selecting the compliance connections option causes the GUI to display the connections in the compliance back office; selecting the risk connections option causes the GUI to display the connections in the risk back office, and so on. In the example shown in FIG. 12, none of the back office connections options have been selected by the user 106. Selecting the compliance connections option in the connections menu, as shown in section 1301 of FIG. 13, causes the GUI to display the connections in the compliance back office, as shown in section 501 of FIG. 5. Displaying the compliance connections via the GUI enables the user 106 to, for example, quickly identify which traders spend the most amount of time communicating with parties within the compliance department.

c. External Entities

In general, selecting a connections option in the external entities category causes the GUI to display connections associated with a predetermined group or entity (e.g., a corporation, a division of a bank, etc.). Connections options in the external entities category shown in FIG. 12 include specific entities, namely, Aegisoft™, Alaris Trading™, Bank of America™, and so on. Selecting the Aegisoft™ connections option causes the GUI to display the Aegisoft™ connections; selecting the Alaris Trading™ connections option causes the GUI to display the Alaris Trading™ connections, and so on. The particular connections options shown in FIG. 12 should not be construed as limiting. In the example shown in FIG. 12, the user 106 has selected the Concept Capital™ connections option.

5. Group by Button

Figure 14:
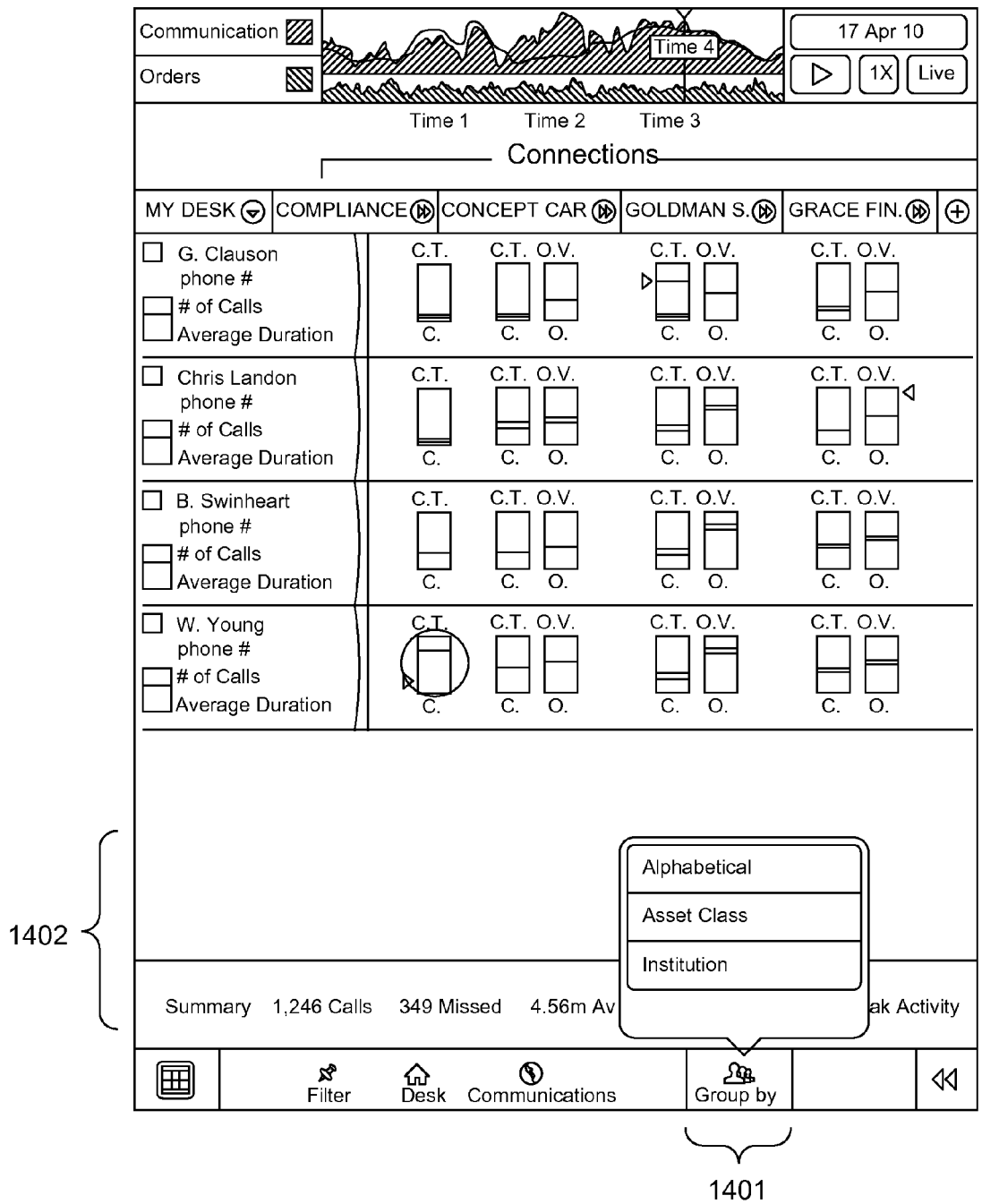
FIG. 14 is a representative view of an example user interface in accordance with a further example embodiment of the invention.

Selecting the group by button, in section 1401 (FIG. 14) of the GUI, causes the GUI to display a group by menu, such as the group by menu shown in FIG. 14 (section 1402). The user 106 may select, via the group by menu, one or more group by options to group the connections presented via the GUI based on predetermined criteria associated with the group by option. Example group by options, as shown in FIG. 14 (1402), include an alphabetical option, an asset class option, and an institution option. The particular group by options shown in FIG. 14 (section 1402) should not be construed as limiting.

Selecting a particular group by option has a slightly different effect, depending on whether the GUI is currently displaying the connections diagram or the summary view. If the GUI is currently displaying the connections diagram, then selecting a group by option causes the GUI to group the connections on the right side of the connections diagram (e.g., on the right side of FIG. 4) based on the criteria associated with the selected group by option. If the GUI is currently displaying the summary view, then selecting a group by option causes the GUI to group the connections into columns on the right side of the summary diagram (e.g., FIG. 14) based on the criteria associated with the selected group by option.

Figure 15:
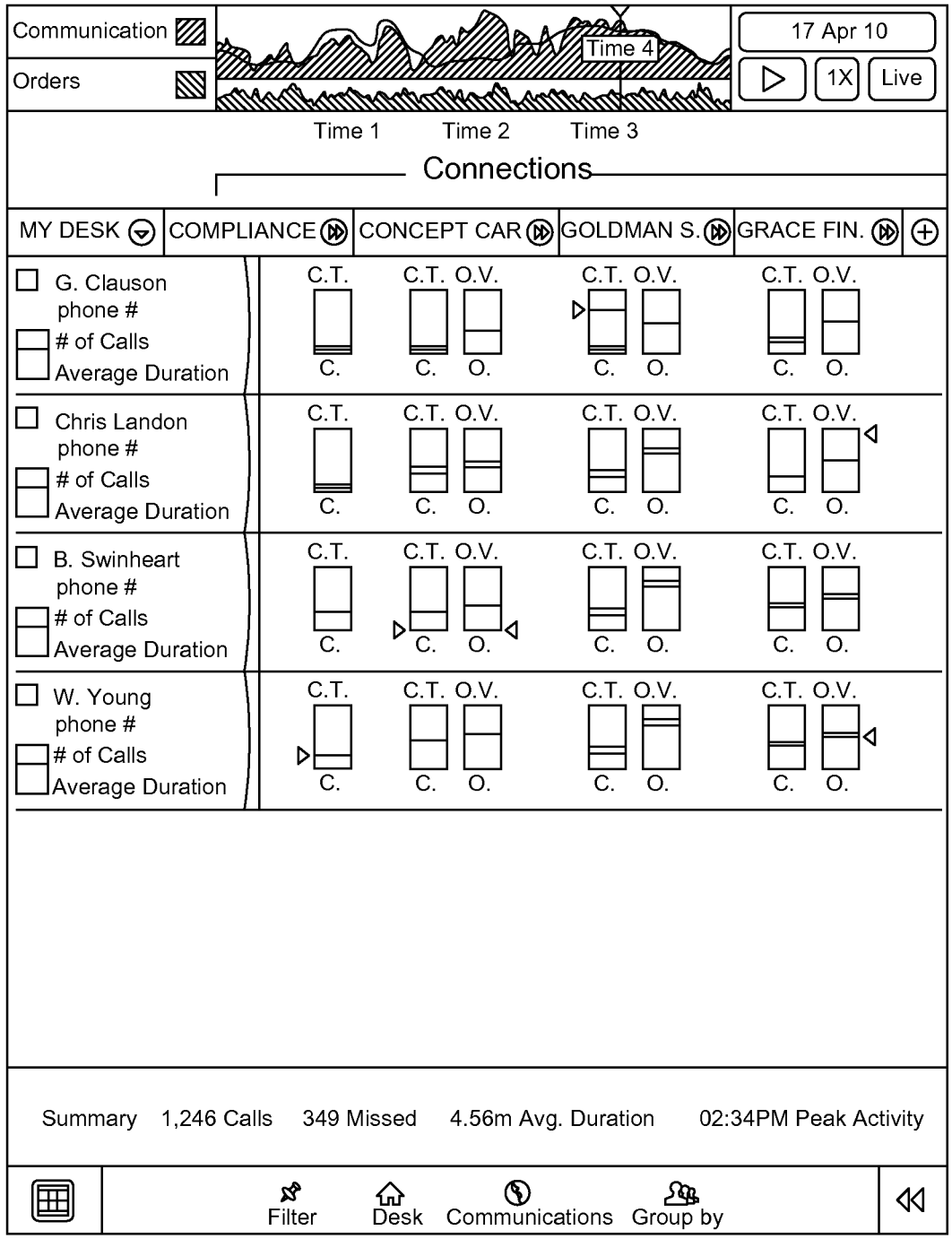
FIG. 15 is a representative view of an example user interface in accordance with yet another example embodiment of the invention.

Selecting the asset class group by option causes the GUI to group the connections based on asset class, for example, as shown in FIG. 15. Shown for each trader and group is one or more bar chart(s) indicating an amount of calls (C), a call time (CT), an amount of orders (O), and/or an order volume (OV). This view enables the user 106 to, for example, identify which traders are engaging in the greatest amount of call volume, call duration, and/or order volume with respect to assets of a particular asset class. This view also enables the user 106 to identify which traders are engaging in a high level of cross-asset trading (i.e., trading involving assets belonging to more than one asset class). For example, the user 106 may identify which derivatives trader has the highest amount of bond orders. The user 106 may also identify, for example, which traders have an above-average amount of derivatives orders.

E. Trader Efficiency

In another example embodiment, the GUI can be used to gauge trader effectiveness and/or efficiency based on a value (e.g., in U.S. dollars) per communication. For example, the user 106 can analyze the amount of time a particular trader communicates with outside trading partners against the amount of revenue that is generated off of that particular relationship. A combination of low communications and high revenue may indicate a high effectiveness and efficiency for that particular relationship. The inverse may indicate an ineffective relationship. This information can be used to determine the best relationships for a trader to focus on, and which ones to minimize, thereby leading to more efficient and effective operations.

VI. Device

Figure 16:
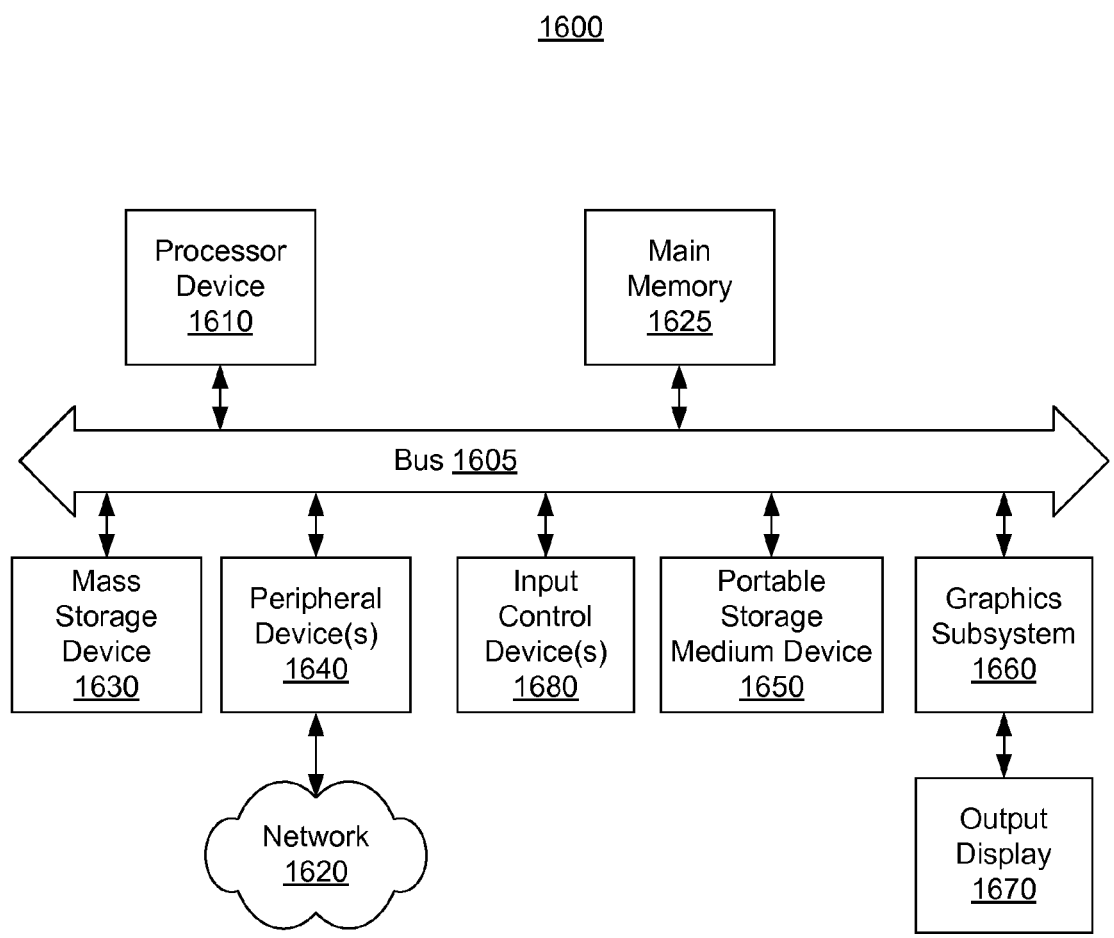
FIG. 16 is a block diagram of an example computer useful for implementing the present invention.

FIG. 16 is a block diagram of a general and/or special purpose computer 1600, which may be a general and/or special purpose computing device, in accordance with some of the example embodiments of the invention. The computer 1600 may be, for example, a user device, a user computer, a client computer and/or a server computer, among other things.

The computer 1600 may include without limitation a processor device 1610, a main memory 1625, and an interconnect bus 1605. The processor device 1610 may include without limitation a single microprocessor, or may include a plurality of microprocessors for configuring the computer 1600 as a multi-processor system. The main memory 1625 stores, among other things, instructions and/or data for execution by the processor device 1610. The main memory 1625 may include banks of dynamic random access memory (DRAM), as well as cache memory.

The computer 1600 may further include a mass storage device 1630, peripheral device(s) 1640, portable storage medium device(s) 1650, input control device(s) 1680, a graphics subsystem 1660, and/or an output display interface 1670. For explanatory purposes, all components in the computer 1600 are shown in FIG. 16 as being coupled via the bus 1605. However, the computer 1600 is not so limited. Devices of the computer 1600 may be coupled via one or more data transport means. For example, the processor device 1610 and/or the main memory 1625 may be coupled via a local microprocessor bus. The mass storage device 1630, peripheral device(s) 1640, portable storage medium device(s) 1650, and/or graphics subsystem 1660 may be coupled via one or more input/output (I/O) buses. The mass storage device 1630 may be a nonvolatile storage device for storing data and/or instructions for use by the processor device 1610. The mass storage device 1630 may be implemented, for example, with a magnetic disk drive or an optical disk drive. In a software embodiment, the mass storage device 1630 is configured for loading contents of the mass storage device 1630 into the main memory 1625.

The portable storage medium device 1650 operates in conjunction with a nonvolatile portable storage medium, such as, for example, a compact disc read only memory (CD-ROM), to input and output data and code to and from the computer 1600. In some embodiments, the software for storing information may be stored on a portable storage medium, and may be inputted into the computer 1600 via the portable storage medium device 1650. The peripheral device(s) 1640 may include any type of computer support device, such as, for example, an input/output (I/O) interface configured to add additional functionality to the computer 1600. For example, the peripheral device(s) 1640 may include a network interface card for interfacing the computer 1600 with a network 1620.

The input control device(s) 1680 provide a portion of the user interface for a user of the computer 1600. The input control device(s) 1680 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 1600 may include the graphics subsystem 1660 and the output display 1670. The output display 1670 may include a cathode ray tube (CRT) display and/or a liquid crystal display (LCD). The graphics subsystem 1660 receives textual and graphical information, and processes the information for output to the output display 1670.

Each component of the computer 1600 may represent a broad category of a computer component of a general and/or special purpose computer. Components of the computer 1600 are not limited to the specific implementations provided here.

As can be appreciated in view of the foregoing description, even with the vast volume of trades taking place in today's financial markets, and the limitless trader communications, market information, and other relevant information, a trading desk of financial traders may be effectively and efficiently managed, in accordance with example embodiments of the invention.

VII. Non-transitory Computer-Readable Medium Implementation

The example embodiments described above such as, for example, the systems and procedures depicted in or discussed in connection with FIGS. 1 to 16, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nano-systems, a molecular memory integrated circuit, a RAID, remote data storage/archive/warehousing, and/or any other type of device suitable for storing instructions and/or data.

Stored on any one of the non-transitory computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such non-transitory computer-readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for providing a graphical user interface (GUI), the system comprising at least one processor, wherein the processor is configured to:
   aggregate communications data received from one or more data sources via a communications network, the communications data including data associated with a communication between a plurality of parties;
   associate the aggregated communications data with supplemental data, thereby resulting in associated communications data;
   correlate the associated communications data based on at least one of temporal data, a tag, a query, or a command, thereby resulting in correlated communications data;
   format the GUI based on the correlated communications data,
      wherein the formatted GUI includes (1) a plurality of GUI elements corresponding to the plurality of parties, respectively, and (2) a communication line interposed between the plurality of GUI elements and corresponding to the communication between the plurality of parties; and
   provide the formatted GUI to a display device.

2. The system of claim 1, wherein the processor is further configured to:
   aggregate market data received from the one or more data sources via the communications network;
   correlate the aggregated market data based on at least one of the communications data, the temporal data, the tag, the query, or the command, thereby resulting in correlated market data; and
   format the GUI based on at least one of the correlated communications data or the correlated market data.

3. The system of claim 1, wherein the processor is further configured to store at least one of the aggregated communications data, aggregated market data, the associated communications data, the correlated data, or the temporal data in a database.

4. The system of claim 1, wherein the one or more data sources include at least one of a communications system, a market data provider, or a contact management system.

5. The system of claim 1, wherein the communications data includes at least one of call data records (CDR), instant message (IM) activity, e-mail activity, an originating telephone number, a destination telephone number, a duration of a communication, a start time of a communication, or an end time of a communication.

6. The system of claim 2, wherein the market data includes at least one of financial index data or individual stock data.

7. The system of claim 1, wherein the supplemental data includes at least one of contact data, a name, a company, an asset class, a trade value, or a trading desk associated with a telephone number.

8. The system of claim 1, wherein the temporal data includes at least one of a time associated with a particular stock price, a time associated with a financial index value, a time duration of a communication, a start time of a communication, or an end time of a communication.

9. The system of claim 1, wherein the processor is further configured to:
   receive a command or query inputted by a user via the GUI;
   reformat the GUI based on the received command or query; and
   provide the reformatted GUI to the display device.

10. The system of claim 1, wherein the formatted GUI further includes a timeline, and wherein the communication line is displayed in the formatted GUI during a time the communication between the plurality of parties is active, the time being indicated in the timeline.

11. A method for providing a graphical user interface (GUI), the method comprising performing, by at least one processor:
   aggregating communications data received from one or more data sources via a communications network, the communications data including data associated with a communication between a plurality of parties;
   associating the aggregated communications data with supplemental data, thereby resulting in associated communications data;
   correlating the associated communications data based on at least one of temporal data, a tag, a query, or a command, thereby resulting in correlated communications data;
   formatting the GUI based on the correlated communications data,
      wherein the formatted GUI includes (1) a plurality of GUI elements corresponding to the plurality of parties, respectively, and (2) a communication line interposed between the plurality of GUI elements and corresponding to the communication between the plurality of parties; and
   providing the formatted GUI to a display device.

12. The method of claim 11, further comprising:
aggregating market data received from the one or more data sources via the communications network;
correlating the aggregated market data based on at least one of the communications data, the temporal data, the tag, the query, or the command, thereby resulting in correlated market data; and
formatting the GUI based on at least one of the correlated communications data or the correlated market data.

13. The method of claim 11, further comprising storing at least one of the aggregated communications data, aggregated market data, the associated communications data, the correlated data, or the temporal data in a database.

14. The method of claim 11, wherein the one or more data sources include at least one of a communications system, a market data provider, or a contact management system.

15. The method of claim 11, wherein the communications data includes at least one of call data records (CDR), instant message (IM) activity, e-mail activity, an originating telephone number, a destination telephone number, a duration of a communication, a start time of a communication, or an end time of a communication.

16. The method of claim 12, wherein the market data includes at least one of financial index data or individual stock data.

17. The method of claim 11, wherein the supplemental data includes at least one of contact data, a name, a company, an asset class, a trade value, or a trading desk associated with a telephone number.

18. The method of claim 11, wherein the temporal data includes at least one of a time associated with a particular stock price, a time associated with a financial index value, a time duration of a communication, a start time of a communication, or an end time of a communication.

19. The method of claim 11, further comprising performing, by the at least one processor:
receiving a command or query inputted by a user via the GUI;
reformatting the GUI based on the received command or query; and
providing the reformatted GUI to the display device.

20. The method of claim 11, wherein the formatted GUI further includes a timeline, and wherein the communication line is displayed in the formatted GUI during a time the communication between the plurality of parties is active, the time being indicated in the timeline.

21. A non-transitory computer-readable medium having stored thereon sequences of instructions, the sequences of instructions including instructions, which, when executed by a computer system, cause the computer system to:
aggregating communications data received from one or more data sources via a communications network, the communications data including data associated with a communication between plurality of parties;
associating the aggregated communications data with supplemental data, thereby resulting in associated communications data;
correlating the associated communications data based on at least one of temporal data, a tag, a query, or a command, thereby resulting in correlated communications data;
formatting the GUI based on the correlated communications data,
wherein the formatted GUI includes (1) a plurality of GUI elements corresponding to the plurality of parties, respectively, and (2) a communication line interposed between the plurality of GUI elements and corresponding to the communication between the plurality of parties; and
providing the formatted GUI to a display device.

22. The computer-readable medium of claim 21, wherein the sequences of instructions further include instructions, which, when executed by the computer system, cause the computer system to:
aggregate market data received from the one or more data sources via the communications network;
correlate the aggregated market data based on at least one of the communications data, the temporal data, the tag, the query, or the command, thereby resulting in correlated market data; and
format the GUI based on at least one of the correlated communications data or the correlated market data.

23. The computer-readable medium of claim 21, wherein the sequences of instructions further include instructions, which, when executed by the computer system, cause the computer system to:
store at least one of the aggregated communications data, the aggregated market data, the associated communications data, the correlated data, or the temporal data in a database.

24. The computer-readable medium of claim 21, wherein the one or more data sources include at least one of a communications system, a market data provider, or a contact management system.

25. The computer-readable medium of claim 21, wherein the communications data includes at least one of call data records (CDR), instant message (IM) activity, e-mail activity, an originating telephone number, a destination telephone number, a duration of a communication, a start time of a communication, or an end time of a communication.

26. The computer-readable medium of claim 22, wherein the market data includes at least one of financial index data or individual stock data.

27. The computer-readable medium of claim 21, wherein the supplemental data includes at least one of contact data, a name, a company, an asset class, a trade value, or a trading desk associated with a telephone number.

28. The computer-readable medium of claim 21, wherein the temporal data includes at least one of a time associated with a particular stock price, a time associated with a financial index value, a time duration of a communication, a start time of a communication, or an end time of a communication.

29. The computer-readable medium of claim 21, wherein the sequences of instructions further include instructions, which, when executed by the computer system, cause the computer system to:
receive a command or query inputted by a user via the GUI;
reformat the GUI based on the received command or query; and
provide the reformatted GUI to the display device.

30. The computer-readable medium of claim 21, wherein the formatted GUI further includes a timeline, and wherein the communication line is displayed in the formatted GUI during a time the communication between the plurality of parties is active, the time being indicated in the timeline.

* * * * *

UNITED STATES PATENT AND TRADEMARK OFFICE
CERTIFICATE OF CORRECTION

PATENT NO.        : 8,805,714 B2
APPLICATION NO.   : 13/353932
DATED             : August 12, 2014
INVENTOR(S)       : Parikh et al.

It is certified that error appears in the above-identified patent and that said Letters Patent is hereby corrected as shown below:

In the Specification

COLUMN 9:

Line 36, "increases communication" should be deleted.

COLUMN 12:

Line 44, "playback" should read -- play back --.

COLUMN 17:

Line 15, "includes" should read -- include --.

In the Claims

COLUMN 19:

Line 51, "aggregating:" should read -- aggregate --.
　　Line 55, "associating" should read -- associate --.
　　Line 58, "correlating" should read -- correlate --.
　　Line 61, "formatting" should read -- format --.

Signed and Sealed this
Eighteenth Day of August, 2015

Michelle K. Lee
*Director of the United States Patent and Trademark Office*